Figure 1:
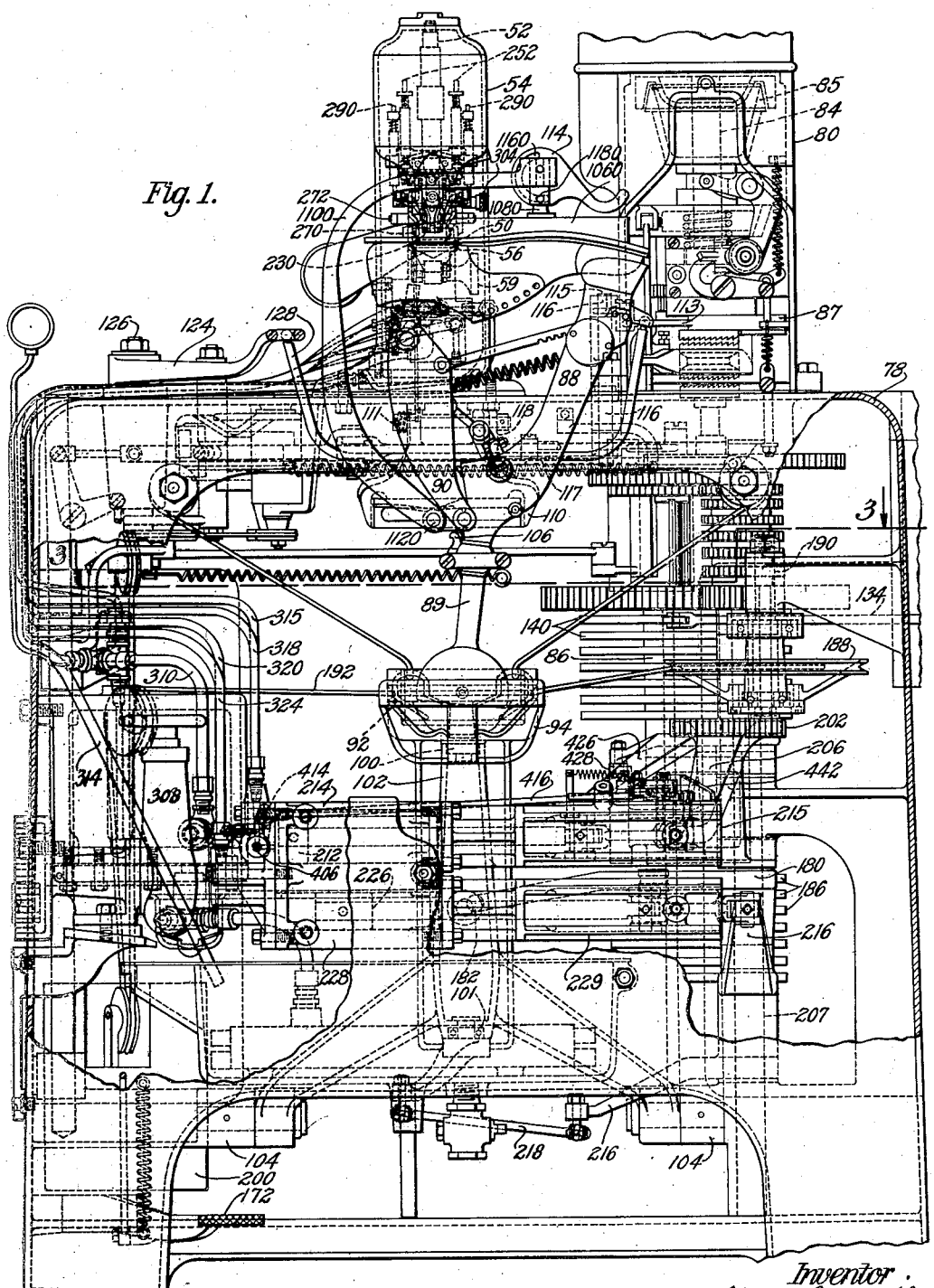

June 18, 1935.  A. R. MORRILL  2,005,104
MACHINE FOR OPERATING UPON SHOES
Filed Jan. 27, 1934   24 Sheets-Sheet 1

Witness
Frank A. Wright.

Inventor
Alfred R. Morrill
by Fish Hildreth
Cary & Jenney Attys.

June 18, 1935. A. R. MORRILL 2,005,104
MACHINE FOR OPERATING UPON SHOES
Filed Jan. 27, 1934 24 Sheets-Sheet 2

June 18, 1935.  A. R. MORRILL  2,005,104
MACHINE FOR OPERATING UPON SHOES
Filed Jan. 27, 1934   24 Sheets-Sheet 4

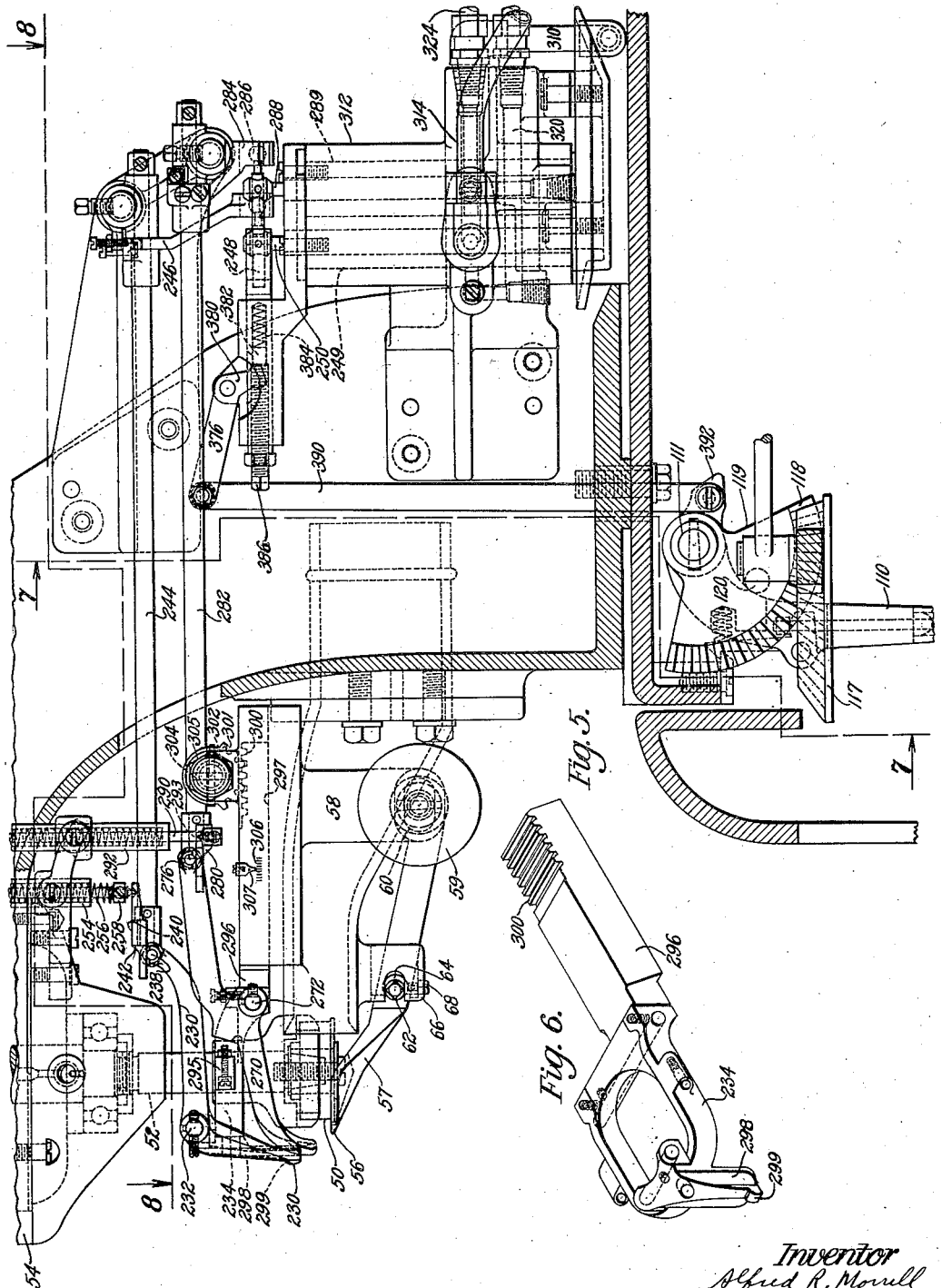

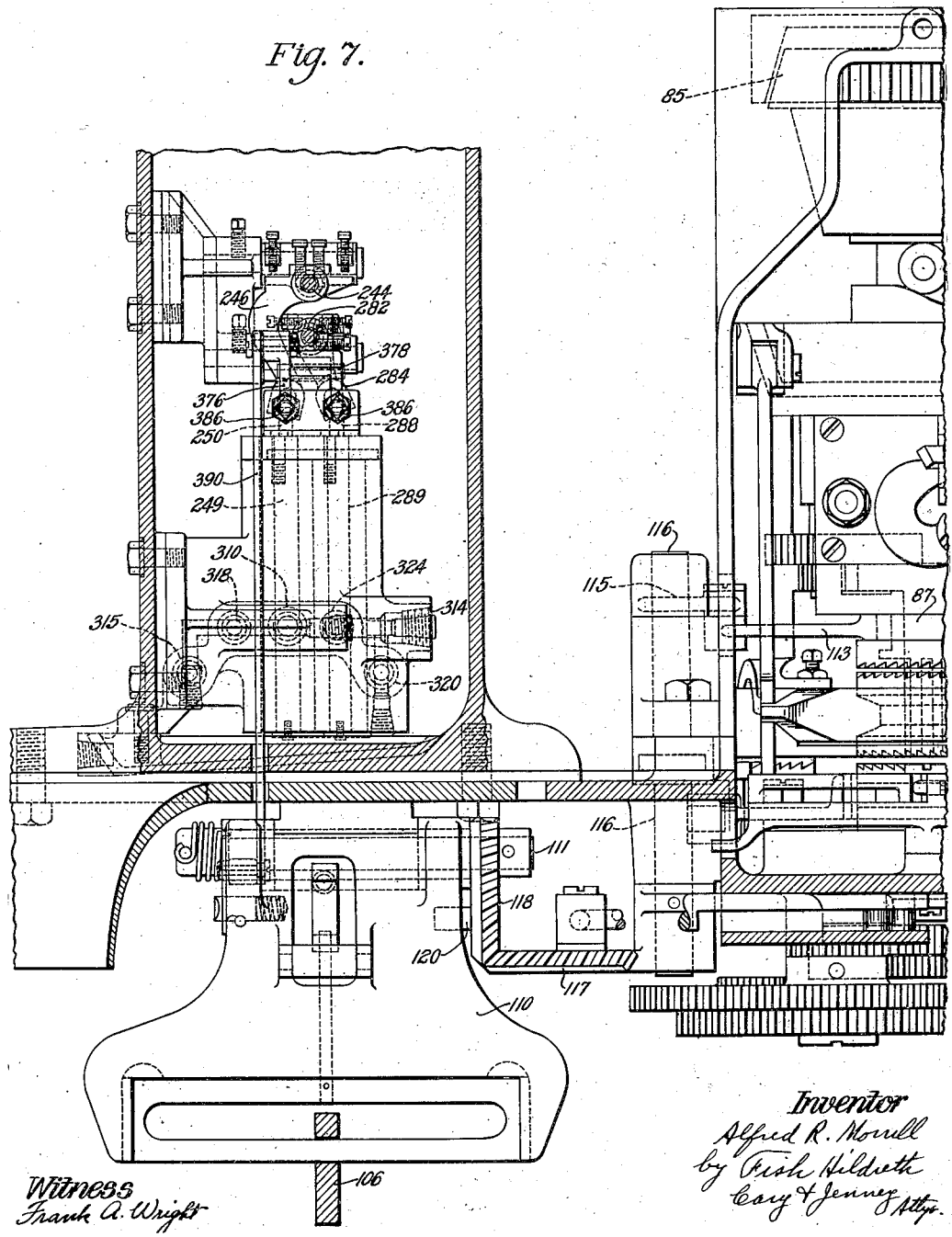

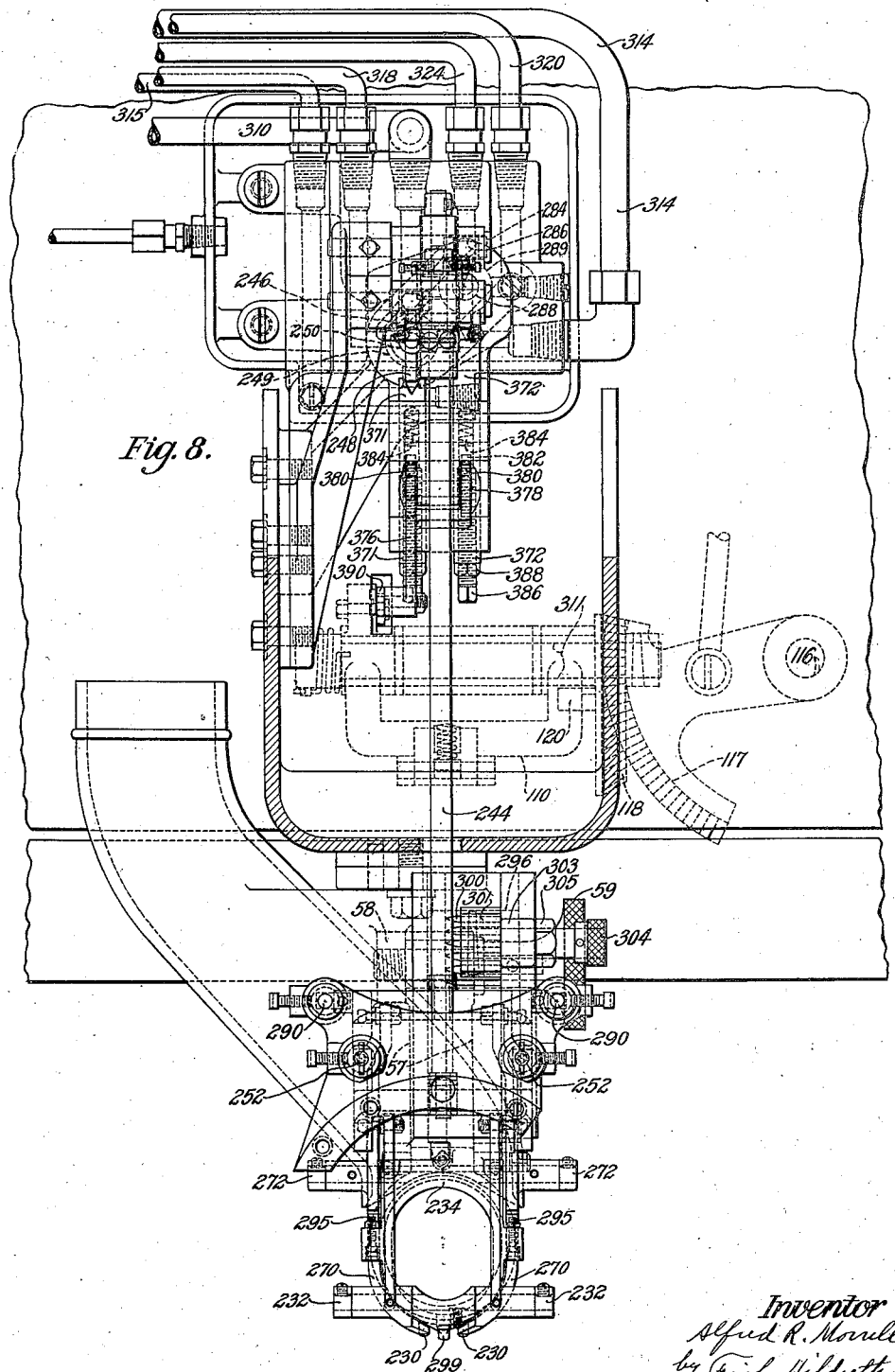

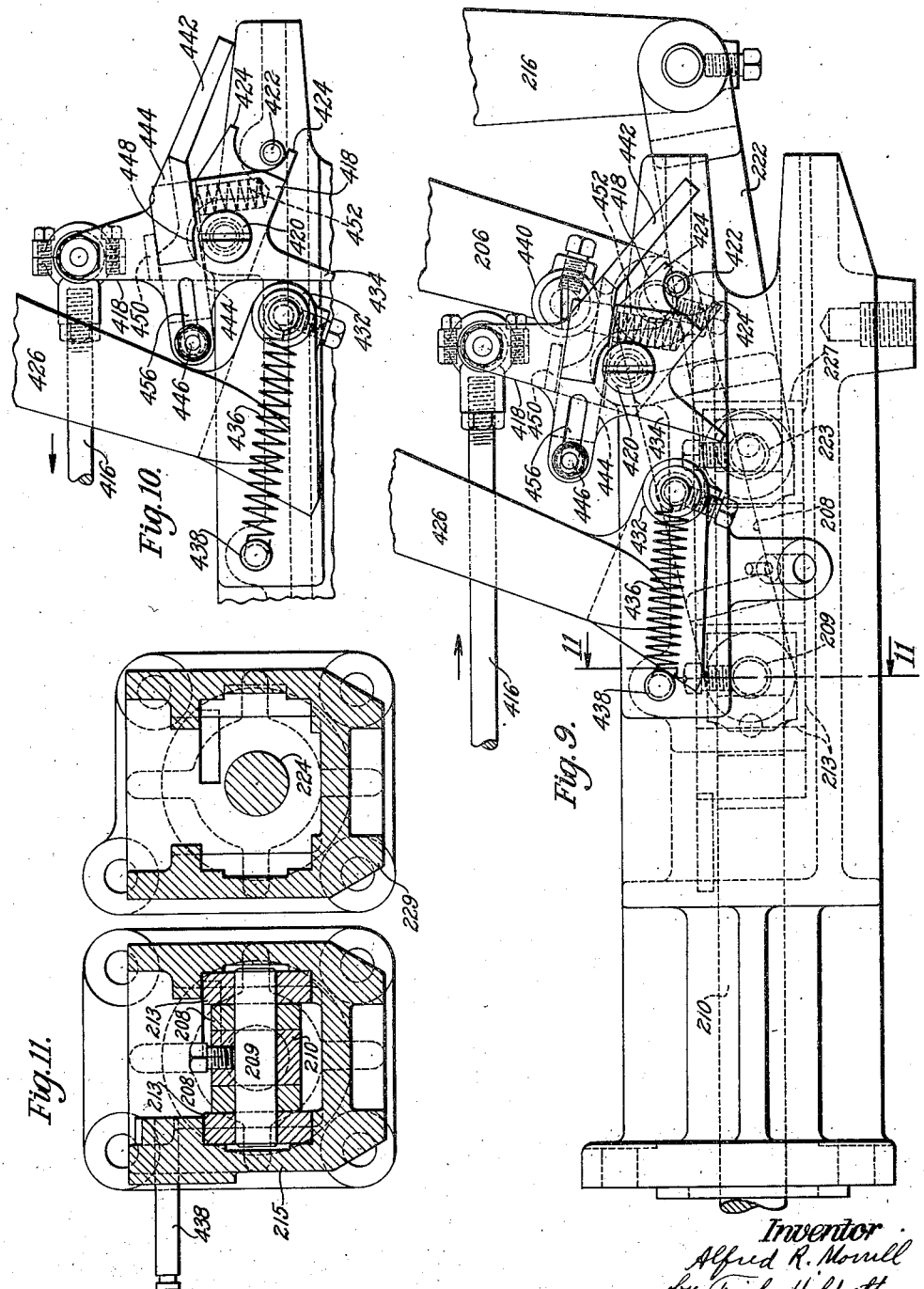

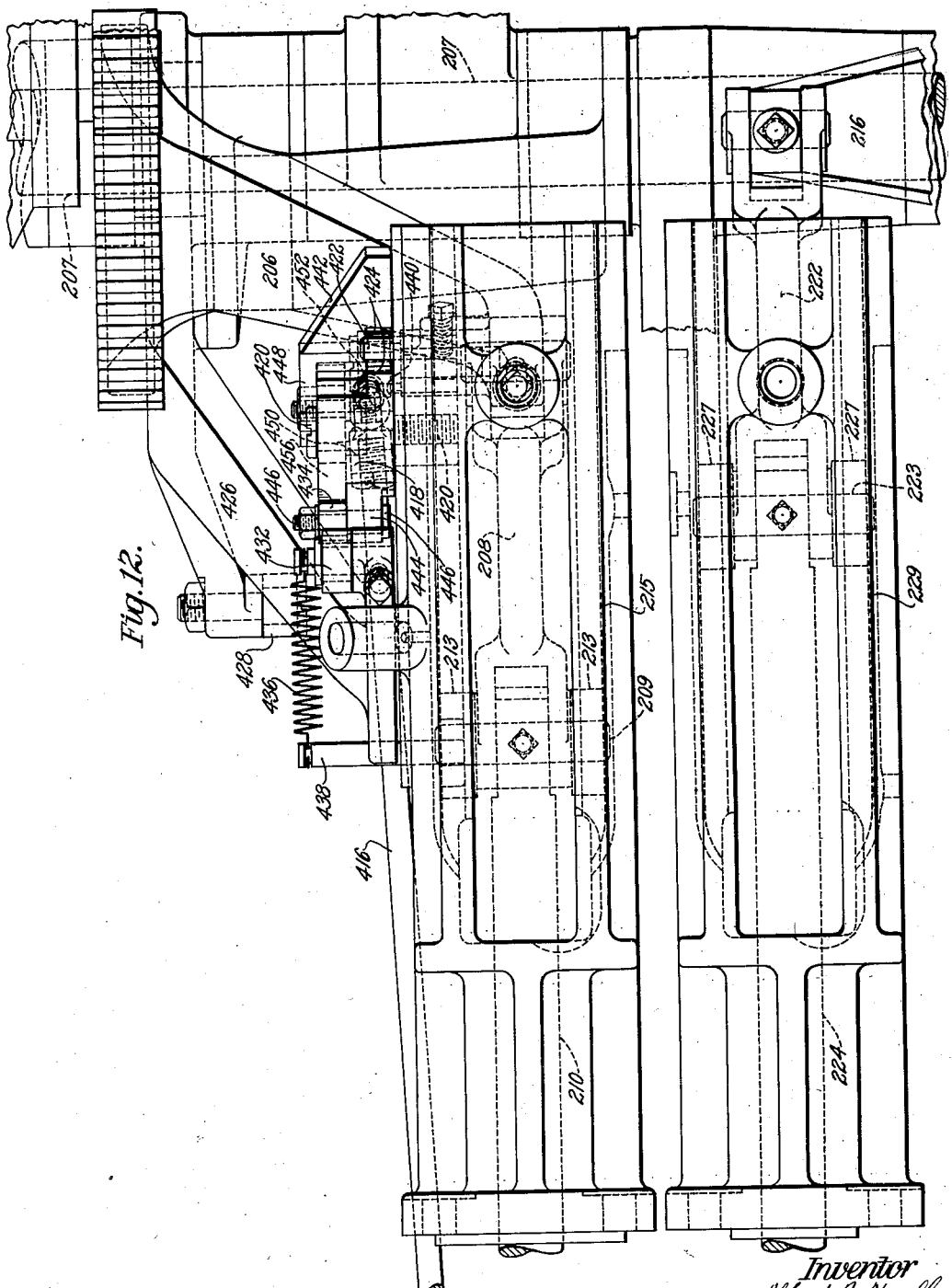

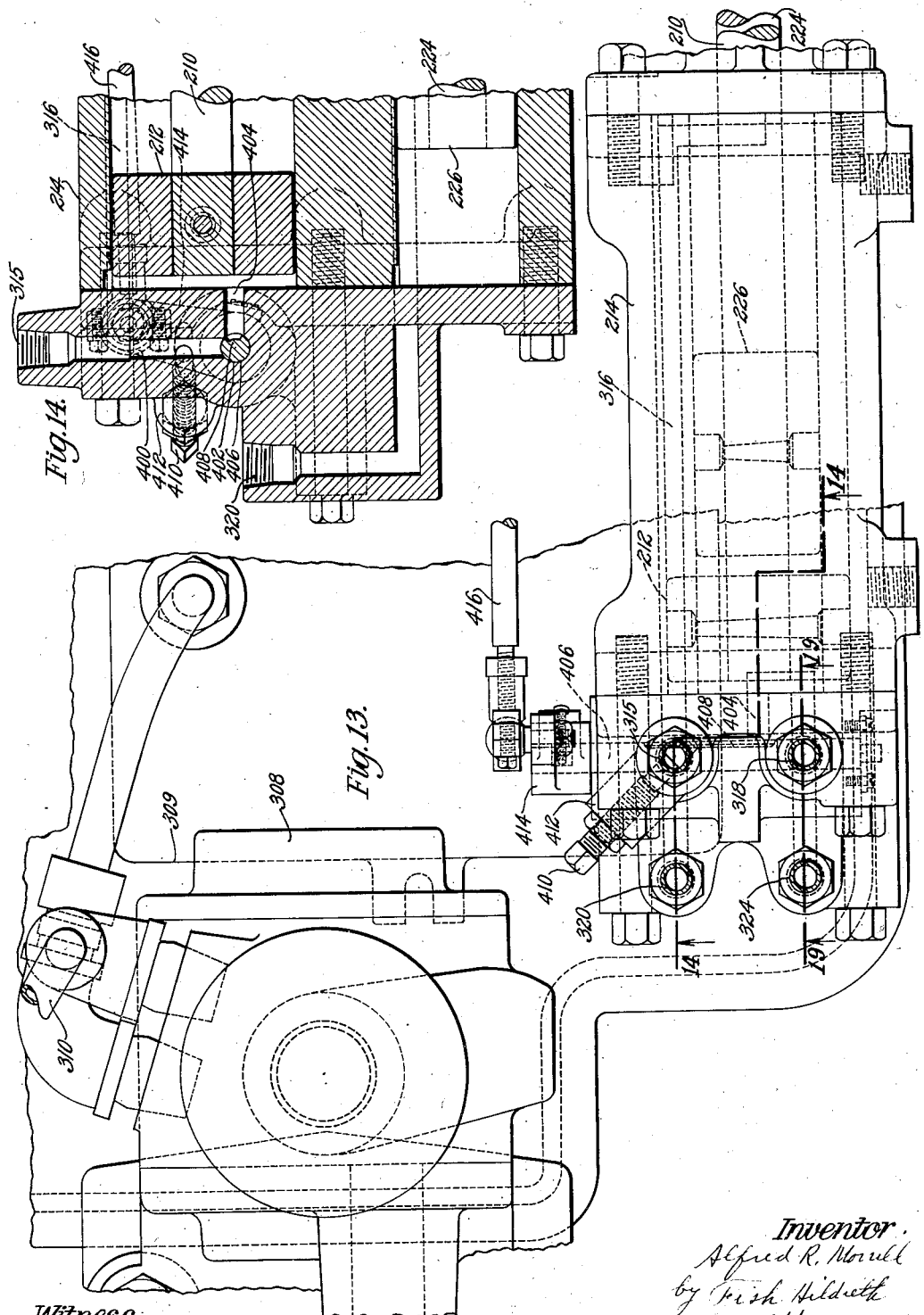

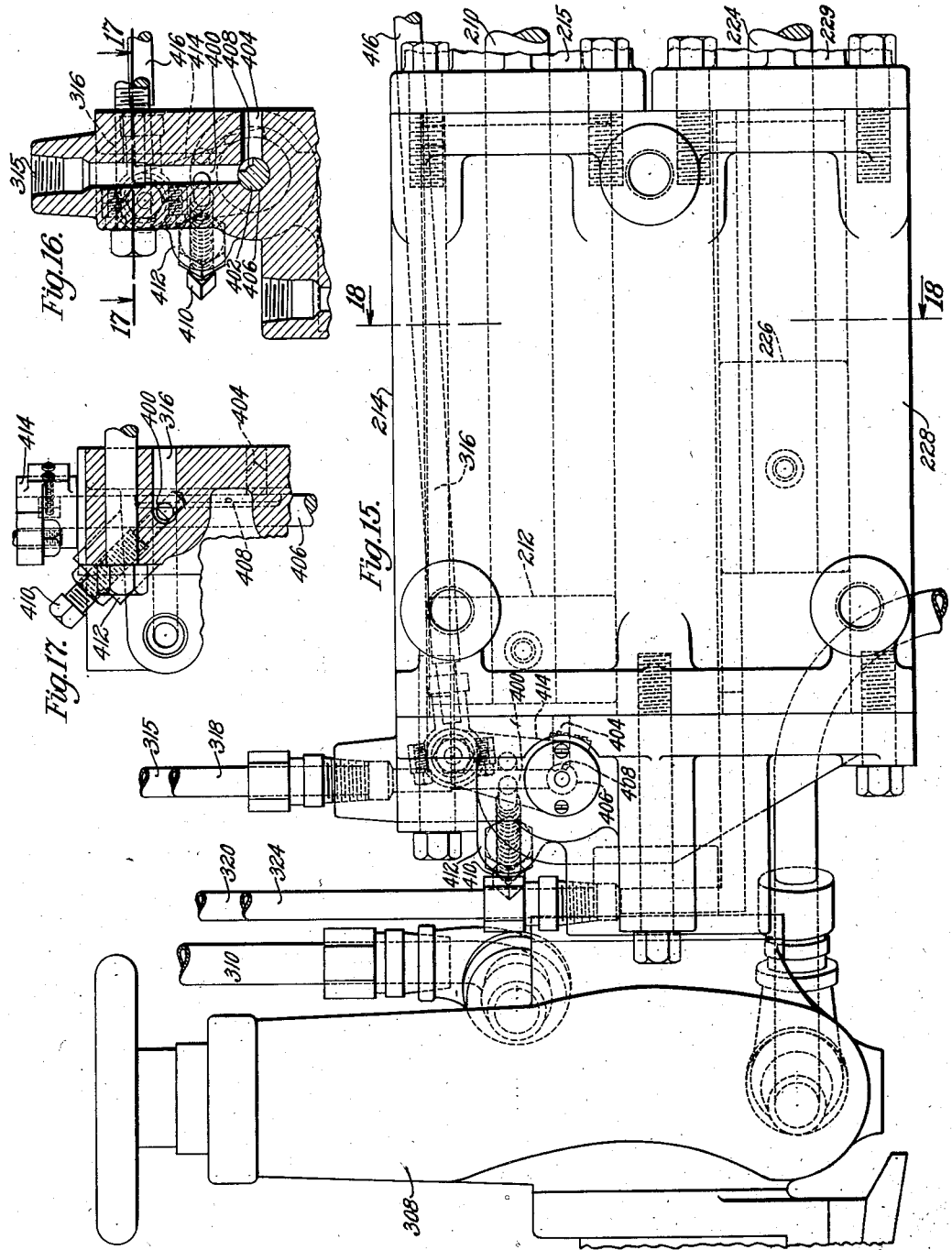

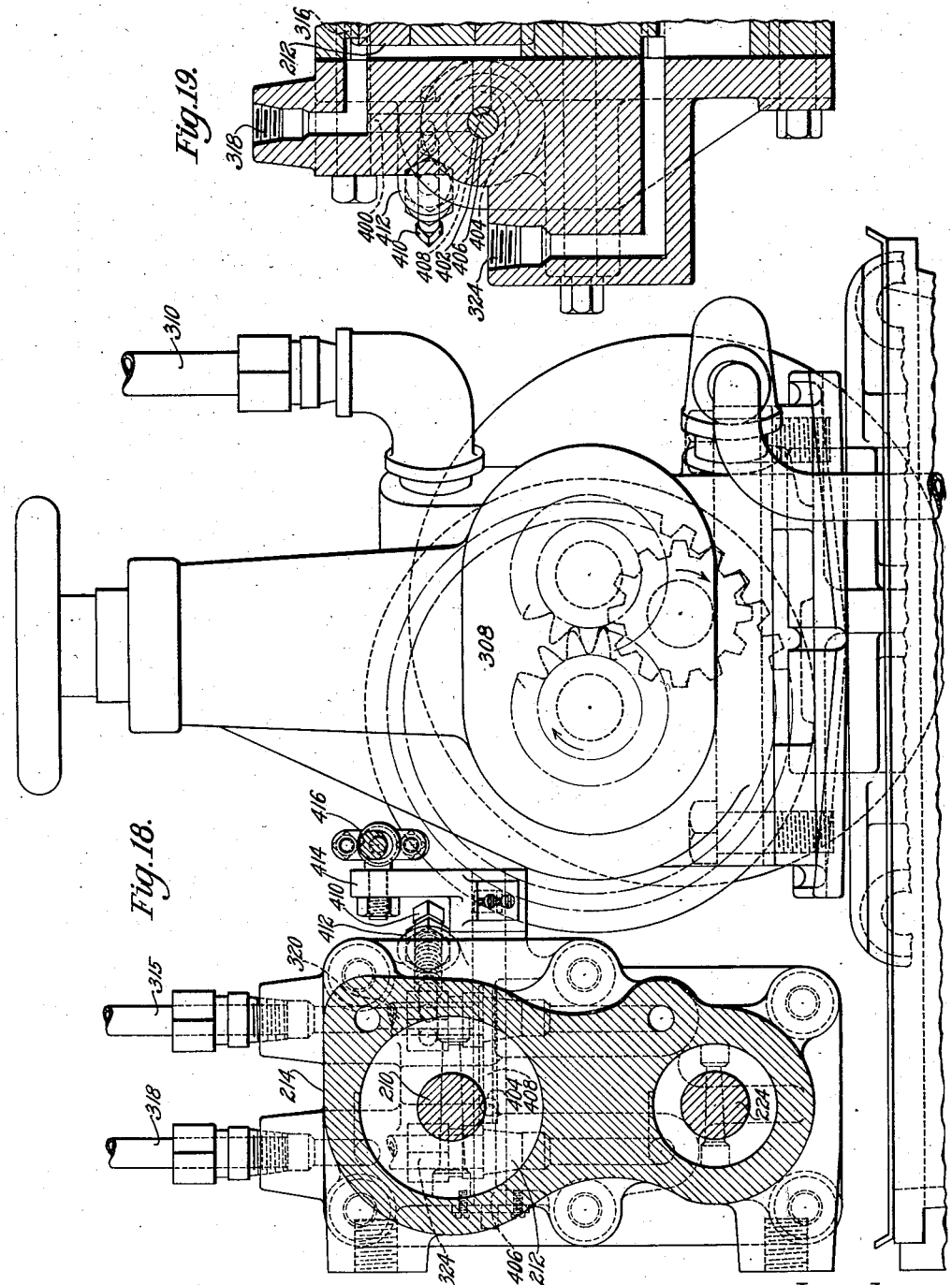

June 18, 1935.  A. R. MORRILL  2,005,104
MACHINE FOR OPERATING UPON SHOES
Filed Jan. 27, 1934  24 Sheets-Sheet 13

Witness
Frank A. Wright

Inventor
Alfred R. Morrill
by Fish Hildreth
Cay & Jenney Attys.

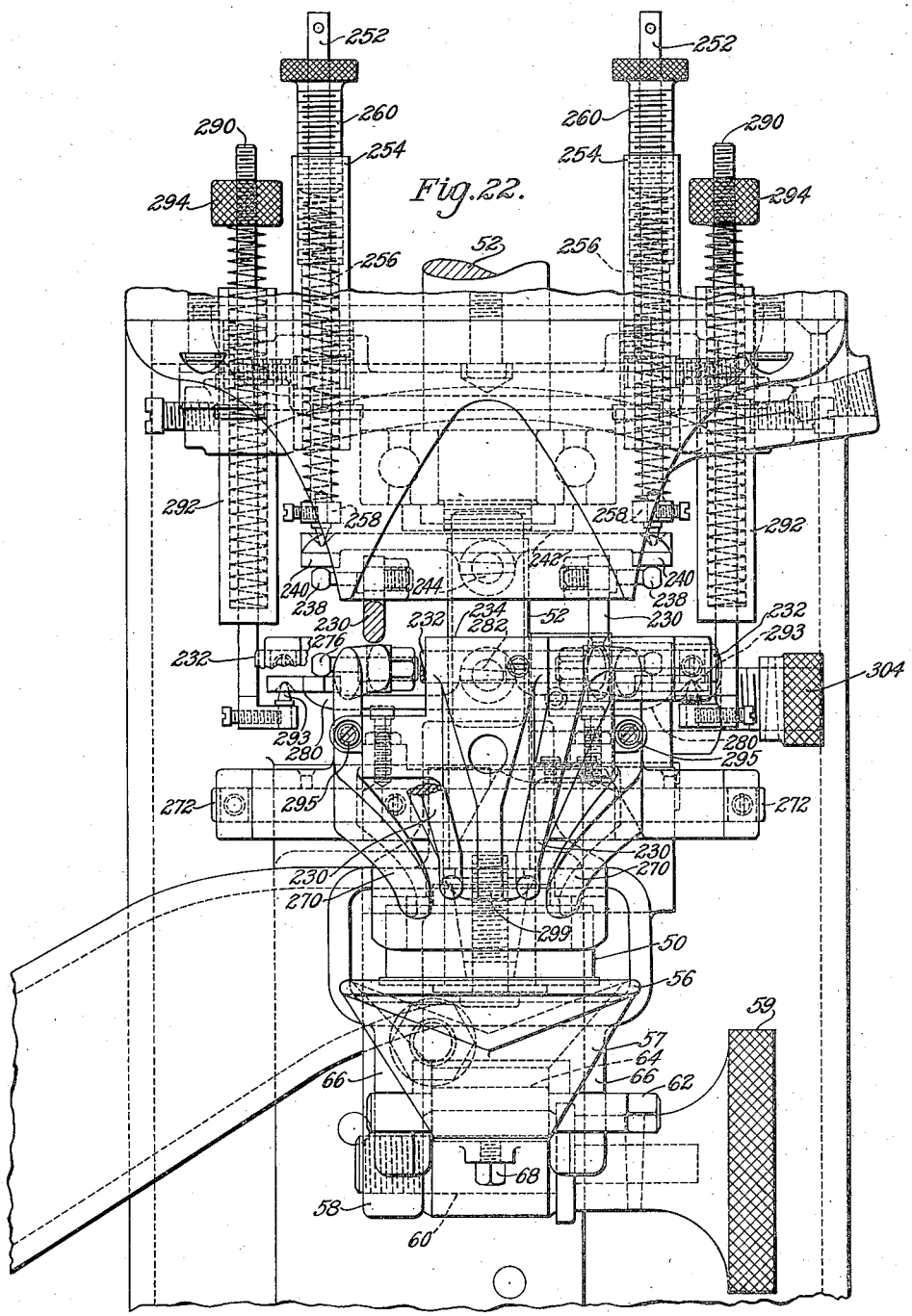

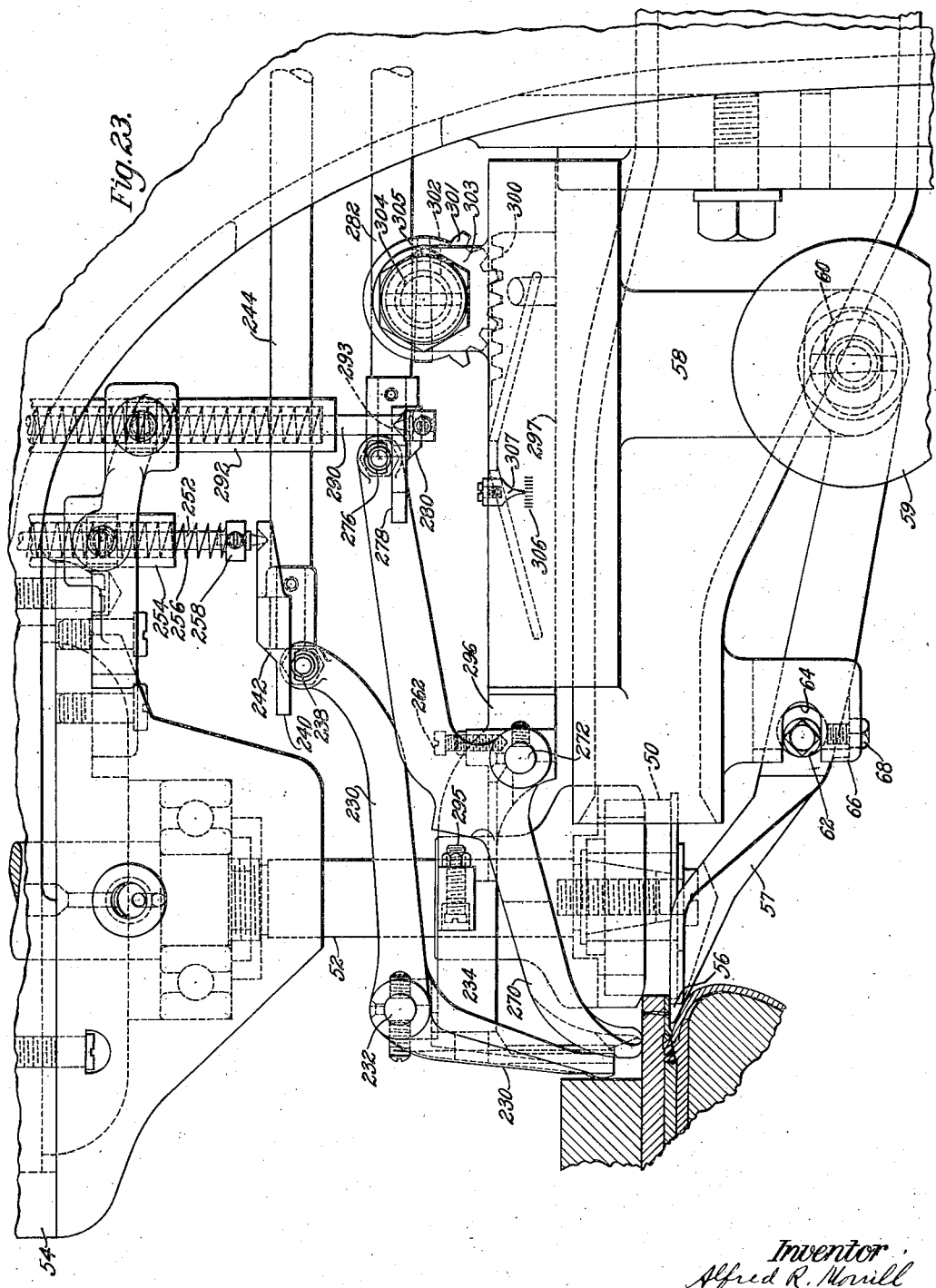

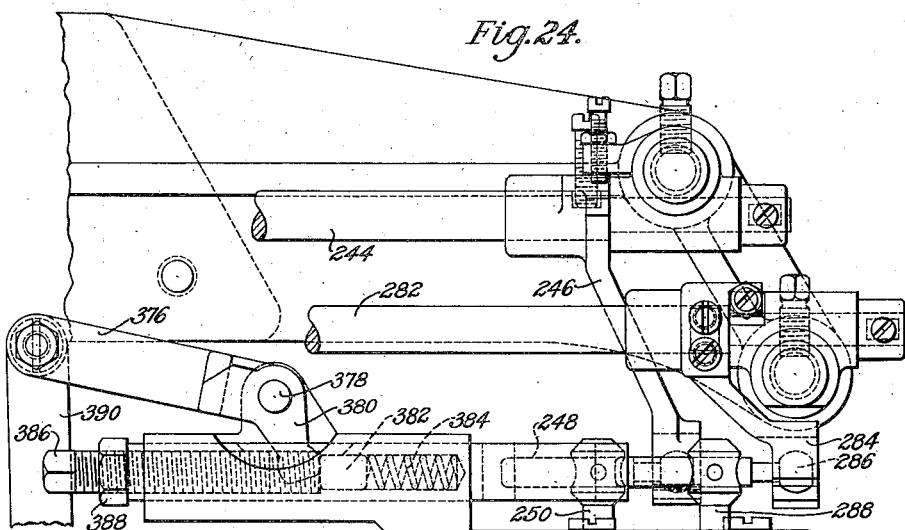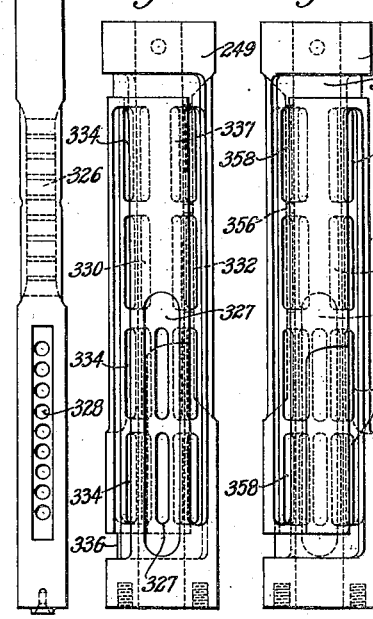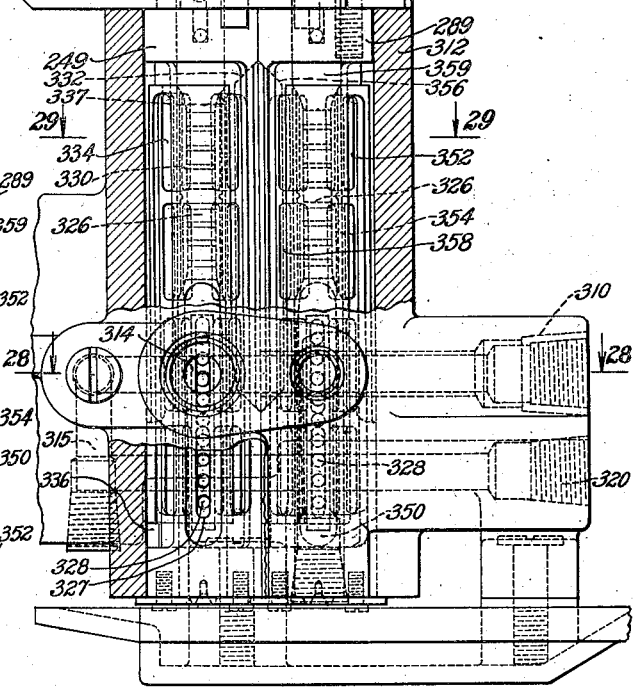

June 18, 1935.   A. R. MORRILL   2,005,104
MACHINE FOR OPERATING UPON SHOES
Filed Jan. 27, 1934   24 Sheets-Sheet 17

Witness
Frank A. Wright

Inventor
Alfred R. Morrill
by Fish Hildreth
Cary & Jenney Attys.

June 18, 1935.  A. R. MORRILL  2,005,104
MACHINE FOR OPERATING UPON SHOES
Filed Jan. 27, 1934  24 Sheets-Sheet 18
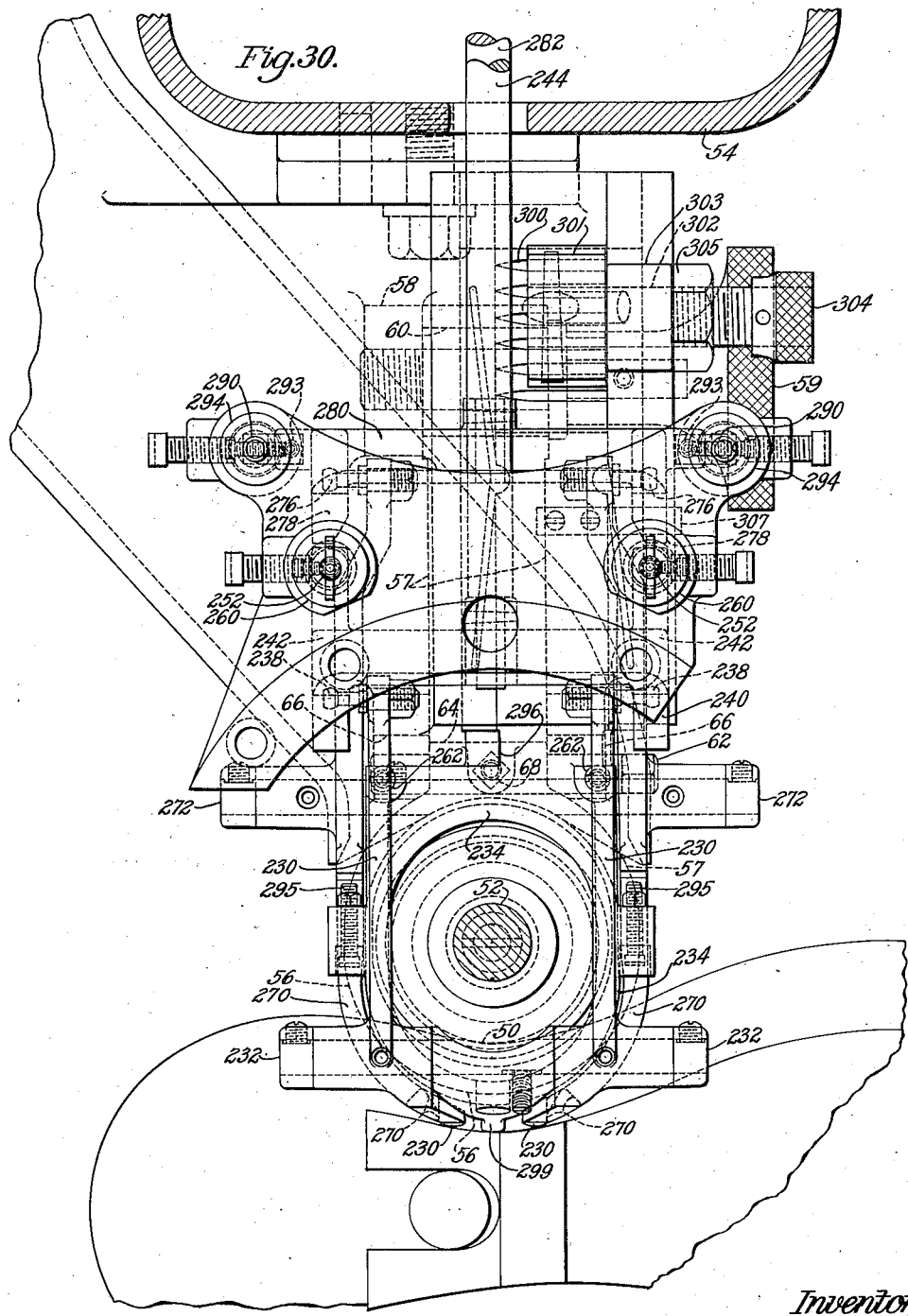

June 18, 1935.  A. R. MORRILL  2,005,104
MACHINE FOR OPERATING UPON SHOES
Filed Jan. 27, 1934   24 Sheets-Sheet 19
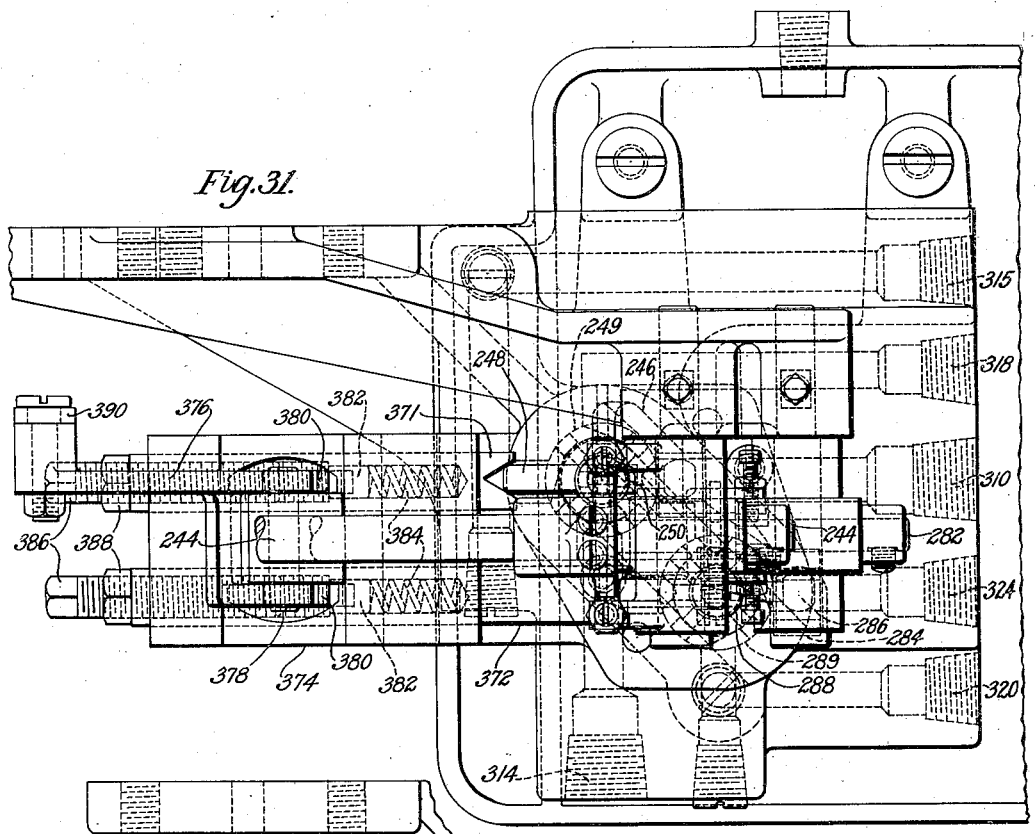
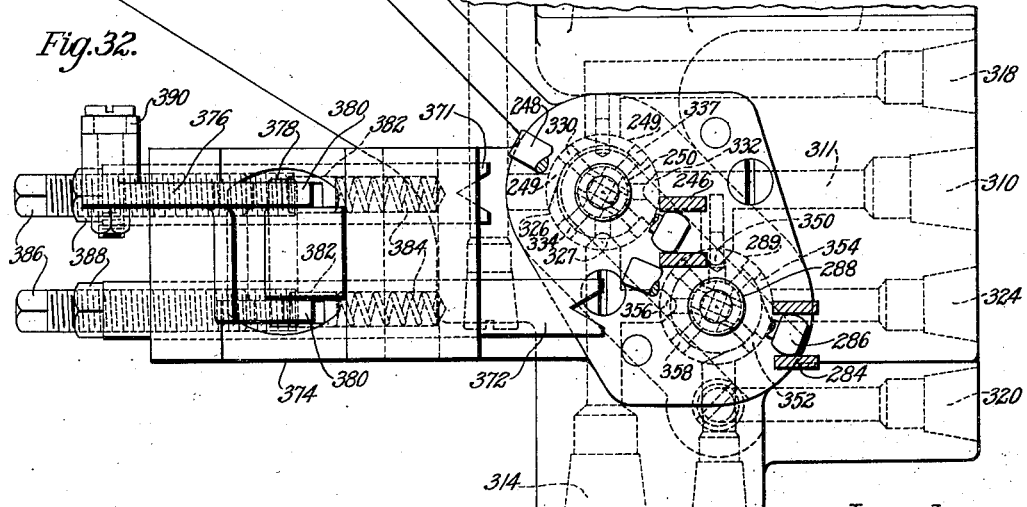

June 18, 1935. A. R. MORRILL 2,005,104
MACHINE FOR OPERATING UPON SHOES
Filed Jan. 27, 1934 24 Sheets-Sheet 20
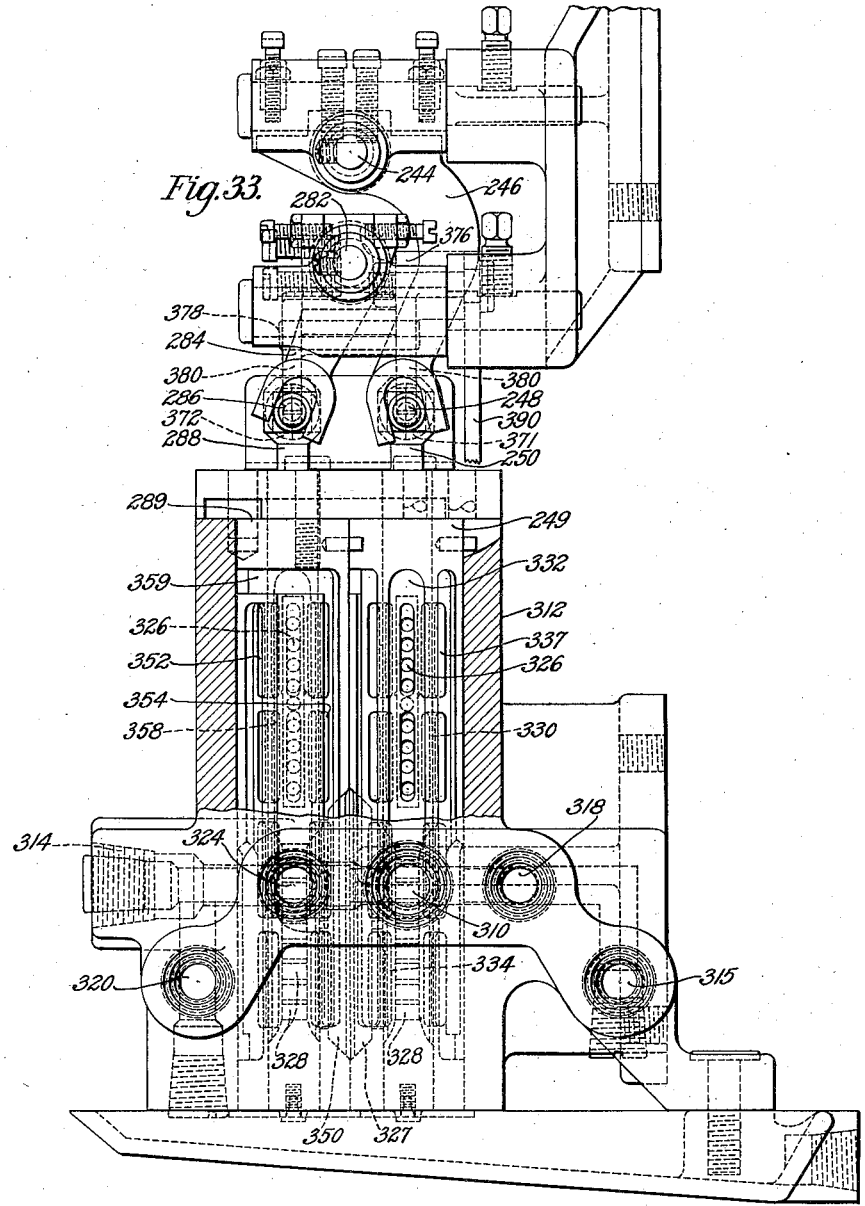
Inventor
Alfred R. Morrill
by Fish Hildreth
Cary & Jenney Attys.
Witness
Frank A. Wright

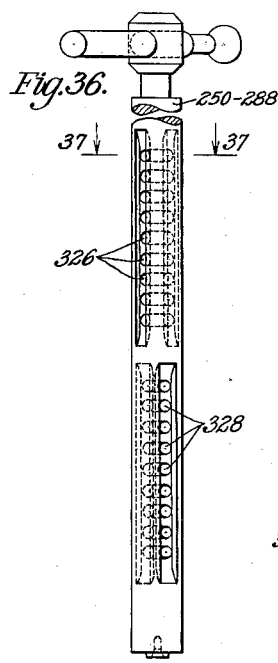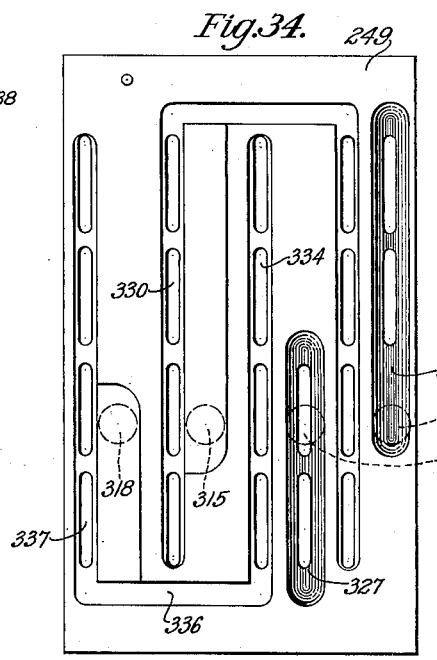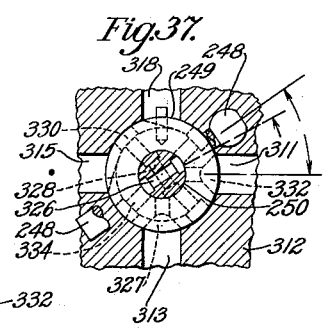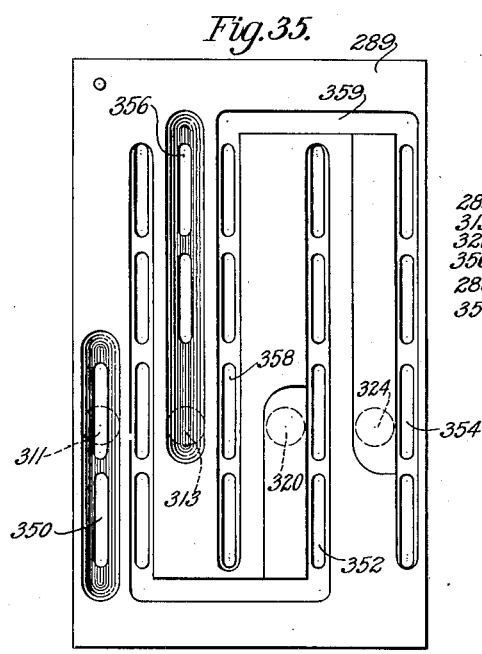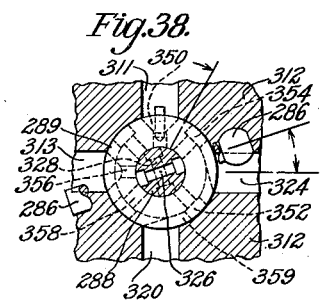

June 18, 1935.  A. R. MORRILL  2,005,104
MACHINE FOR OPERATING UPON SHOES
Filed Jan. 27, 1934  24 Sheets-Sheet 23
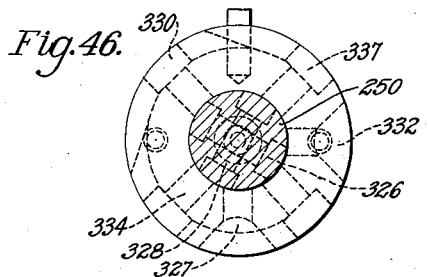
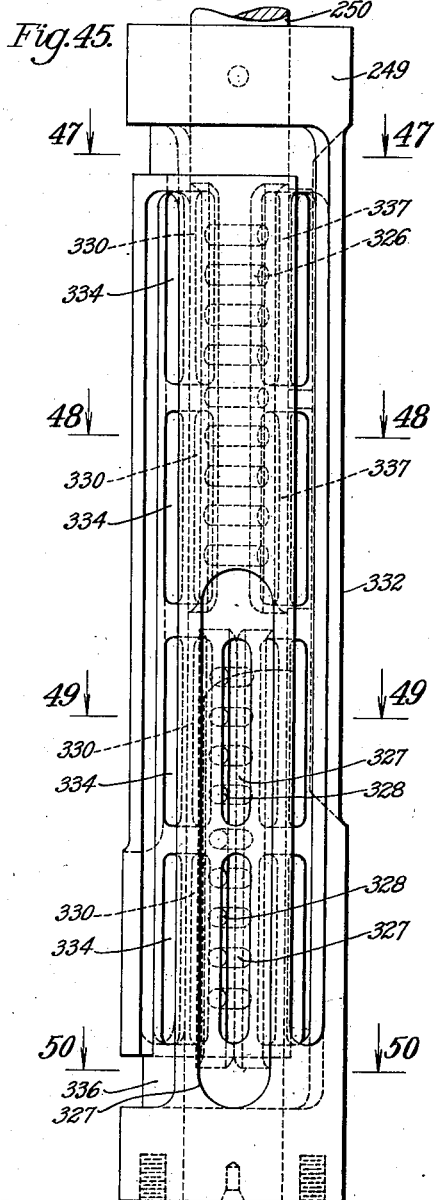
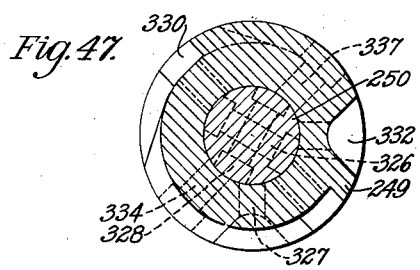
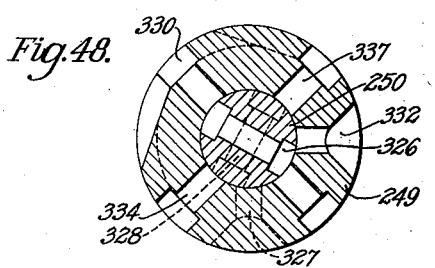
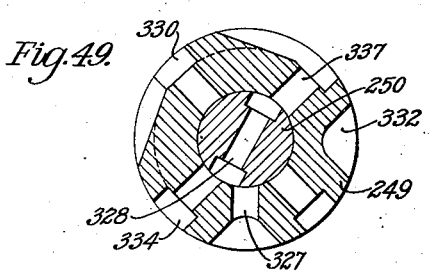
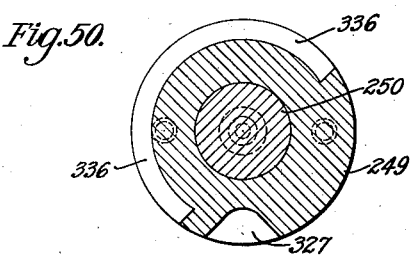

Patented June 18, 1935

2,005,104

UNITED STATES PATENT OFFICE 2,005,104

MACHINE FOR OPERATING UPON SHOES

Alfred R. Morrill, Beverly, Mass., assignor to United Shoe Machinery Corporation, Paterson, N. J., a corporation of New Jersey Application January 27, 1934, Serial No. 708,669

22 Claims. (Cl. 12—17)

The present invention relates to improvements in automatic shoe machines, and is herein disclosed as embodied in an automatic edge trimming machine provided with a shoe supporting jack which is automatically controlled to transfer the point of operation about the shoe and to change relative positions of the shoe and the edge trimming devices to cause the shoe to be presented properly thereto as the point of operation is transferred about the shoe.

As herein disclosed, the jack is mounted at its lower end on a supporting pivot which is arranged to permit turning and feeding movements to be imparted to the jack, and is movable universally to permit longitudinal and lateral tipping movements to be imparted to the jack about the point of operation as the operation progresses around the margin of the shoe. The supporting structure for the jack follows a well known design, in which the jack is connected at its lower end by means of a universal joint to the forward end of a supporting arm which is pivoted at its rear end for vertical movements to raise or lower the jack on a bracket which is pivotally mounted to swing laterally and thus to impart the required longitudinal tipping movements to the jack. The pivot for the bracket is in turn formed on the upper end of a frame which is pivotally supported at its lower end in stationary bearings so that the whole assembly may be moved forwardly and rearwardly of the machine to impart the required lateral tipping movements to the jack.

In prior machines provided with a jack supporting structure of this general description, the several cooperating movements of the jack are ordinarily controlled from a pattern cam shaft by means of cams including a feed cam which is connected through a feed arm and link with the toe rest of the jack to feed the shoe past the operating devices, a turn cam for imparting the required turning movements to the jack, and two tip cams for imparting the required lateral and longitudinal tipping movements to the jack to maintain the required operating relationship of the shoe to the operating devices as the point of operation is transferred about the shoe. With this arrangement and construction of parts, it has been found that in order to meet varying conditions of operation resulting from the wide variety of lasts and sizes of shoes operated upon, a large number of sets of operating cams must be provided.

It is a principal object of the present invention to provide a new and simplified control means for a shoe supporting jack of this general description which requires a minimum of operating parts and is automatically adjustable.

It is another object of the invention to provide a combined cam and feeler mechanism for controlling automatically the operation of a jack of this general description, which is particularly adapted for use in machines for performing the shaping and finishing operations on the edge of the shoe sole, usually designated as rough rounding, edge trimming and edge setting.

It is still another object of the invention to provide a feeler mechanism which is arranged to engage with an arbitrary marginal contour provided by a surface formed preferably on a templet mounted on or adjacent to the bottom surface of the shoe sole.

With these and other objects in view as may hereinafter appear, a principal feature of the invention consists in the provision of a combined cam and feeler control of the jack, which is arranged to permit the control of certain of the jack movements directly from marginal or surface contours on or adjacent to the margin of the shoe, and also permit the use of pattern cams for controlling the remaining movements of the jack, which cams are arranged to produce the correct movements of the jack with relation to the shoe operating devices regardless of variations in the last or size of shoe being operated upon.

More specifically, one feature of the invention consists in the provision of feeler mechanisms arranged to engage with an arbitrarily fixed marginal contour on the shoe and with the surface of the shoe sole to impart the required turning movements and longitudinal or pitch tipping movements to the jack.

Figure 2:
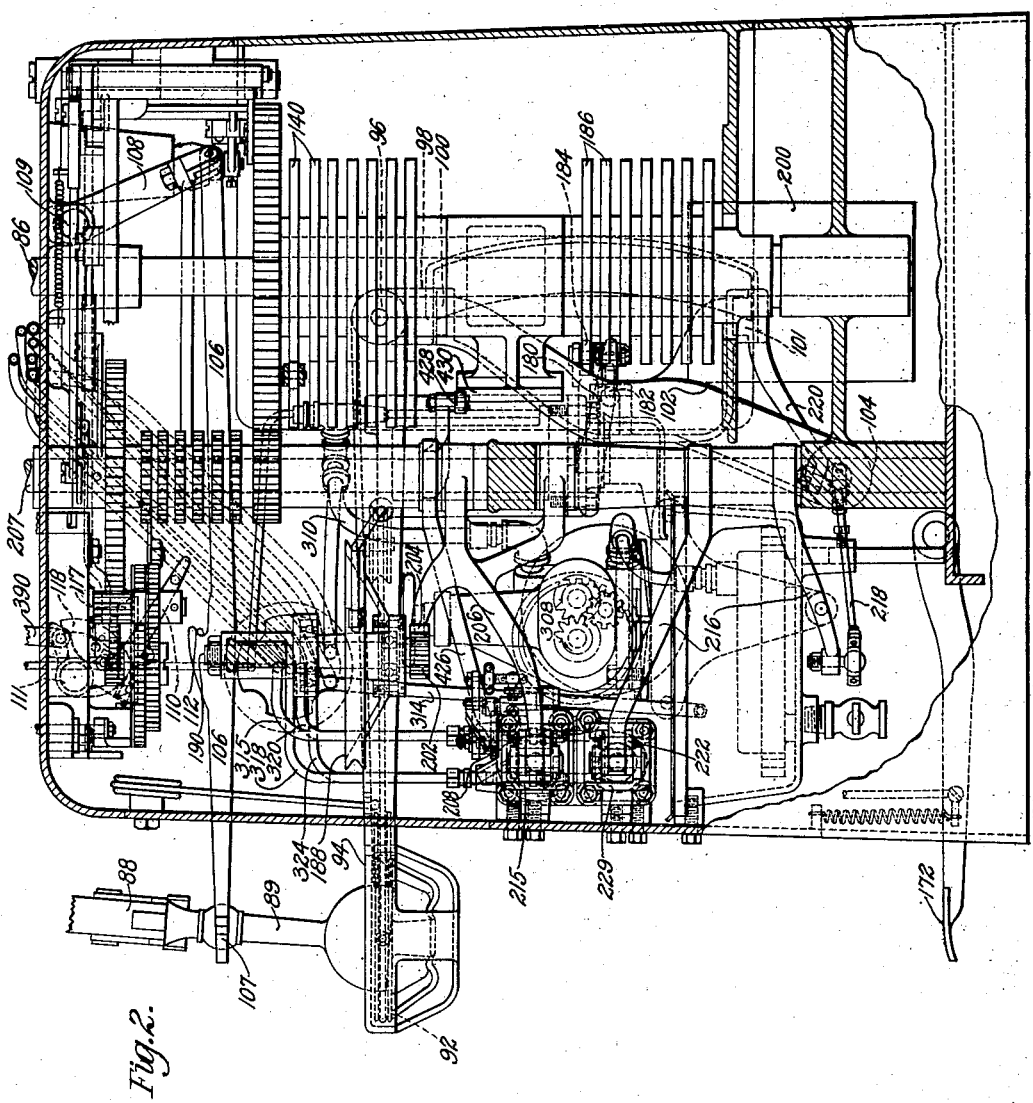
Figure 3:
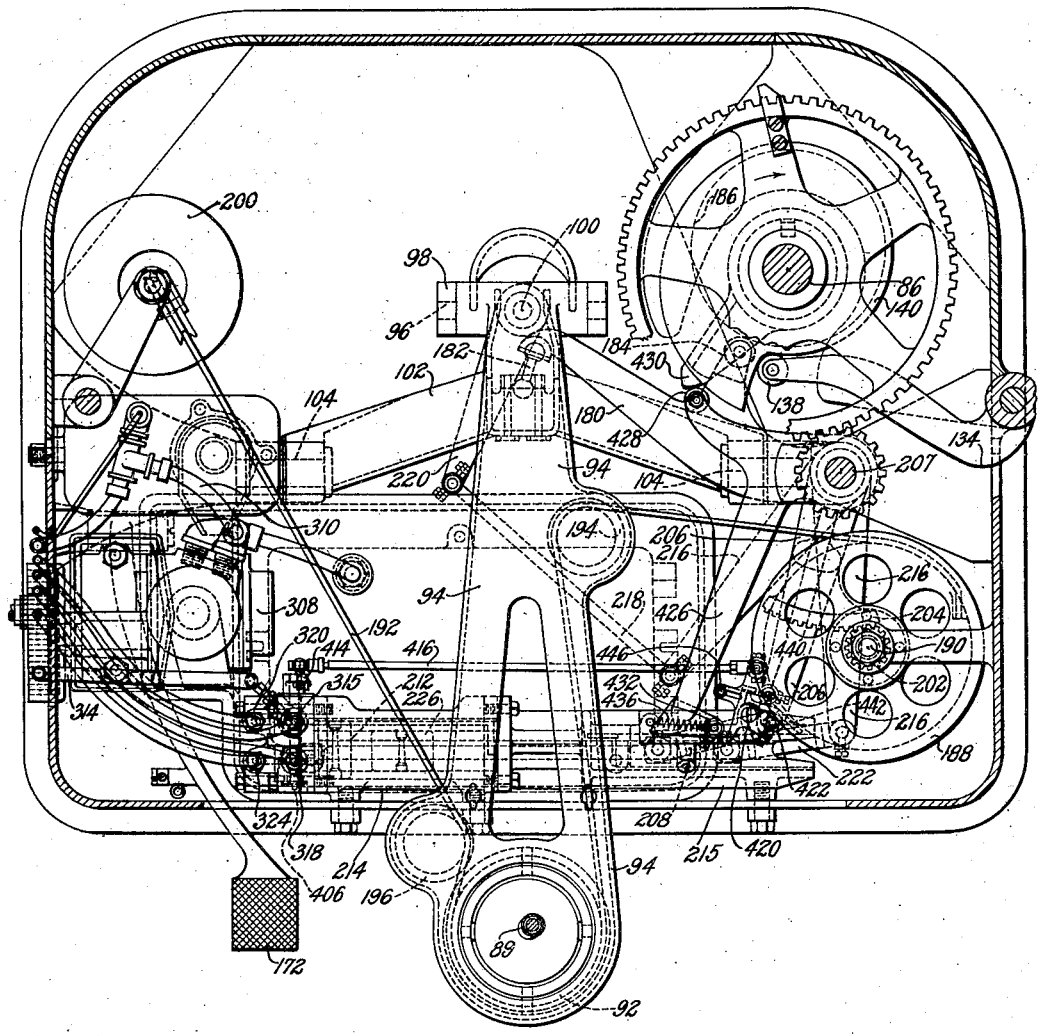
Figure 4:
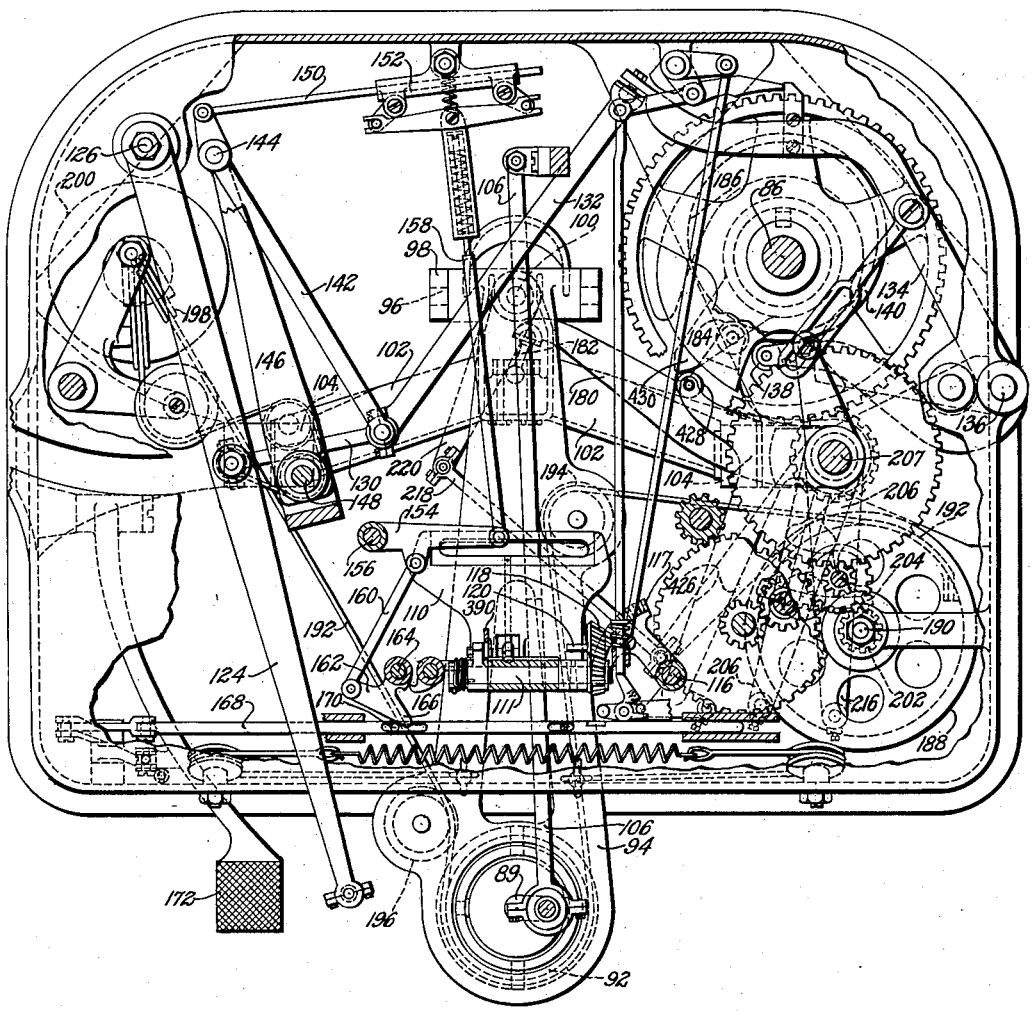
Figure 20:
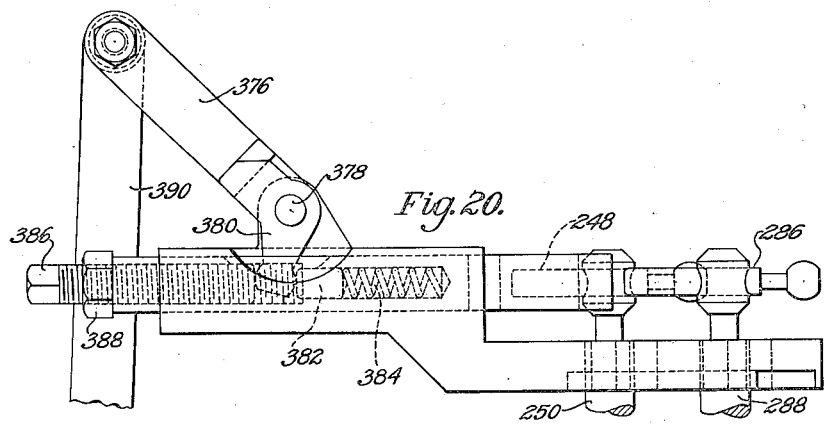
Figure 21:
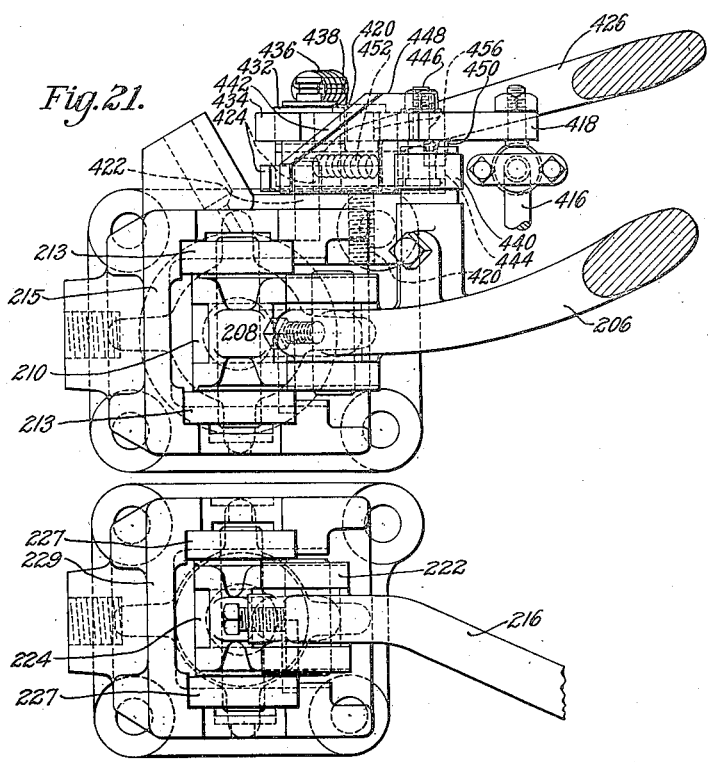
Figure 28:
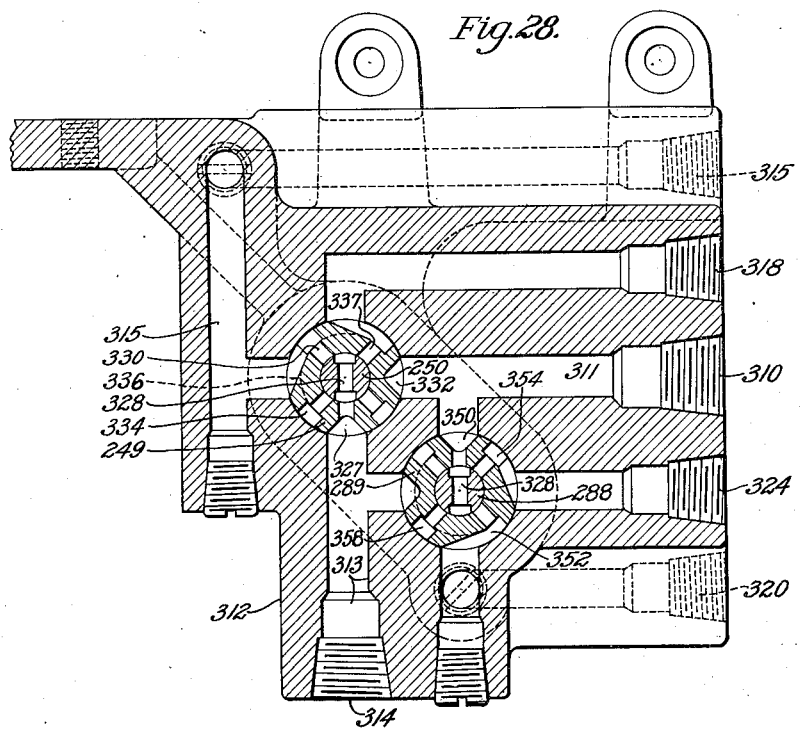
Figure 29:
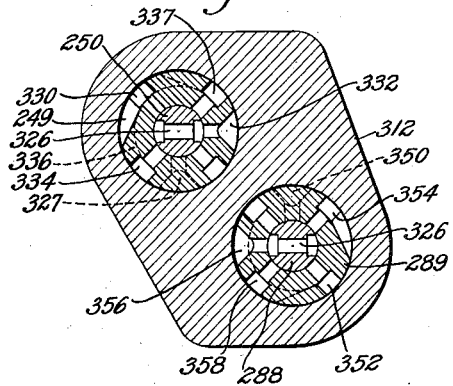
Figure 40:
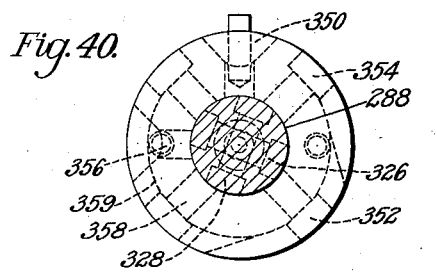
Figure 39:
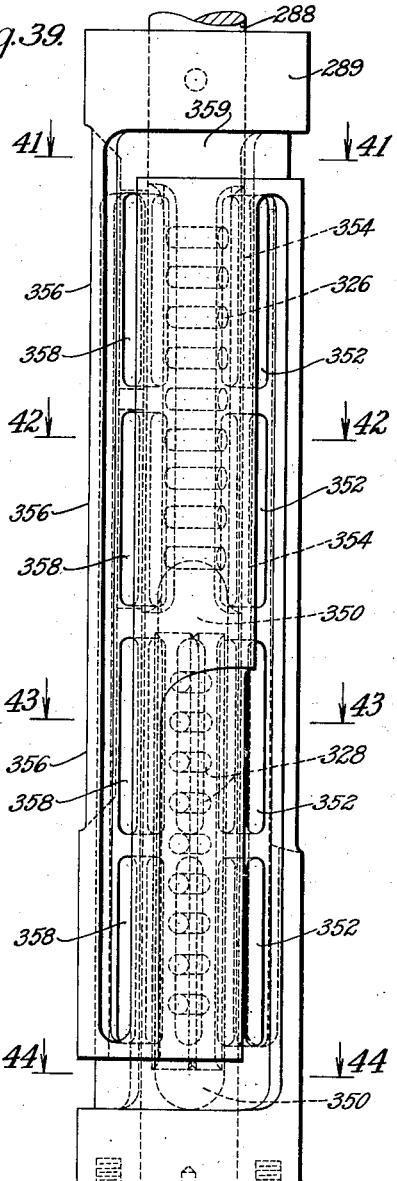
Figure 41:
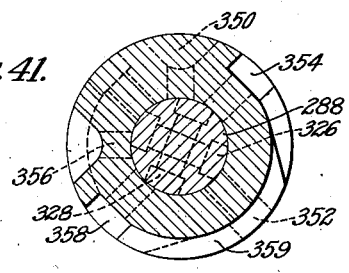
Figure 42:
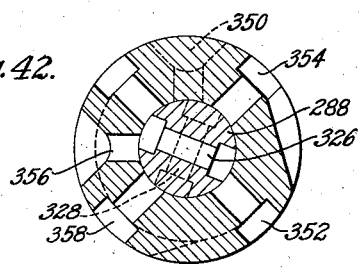
Figure 43:
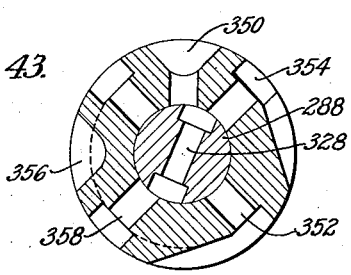
Figure 44:
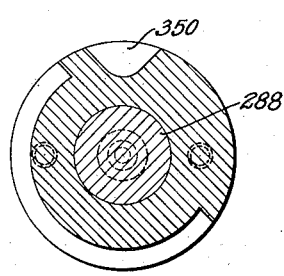
Figure 51:
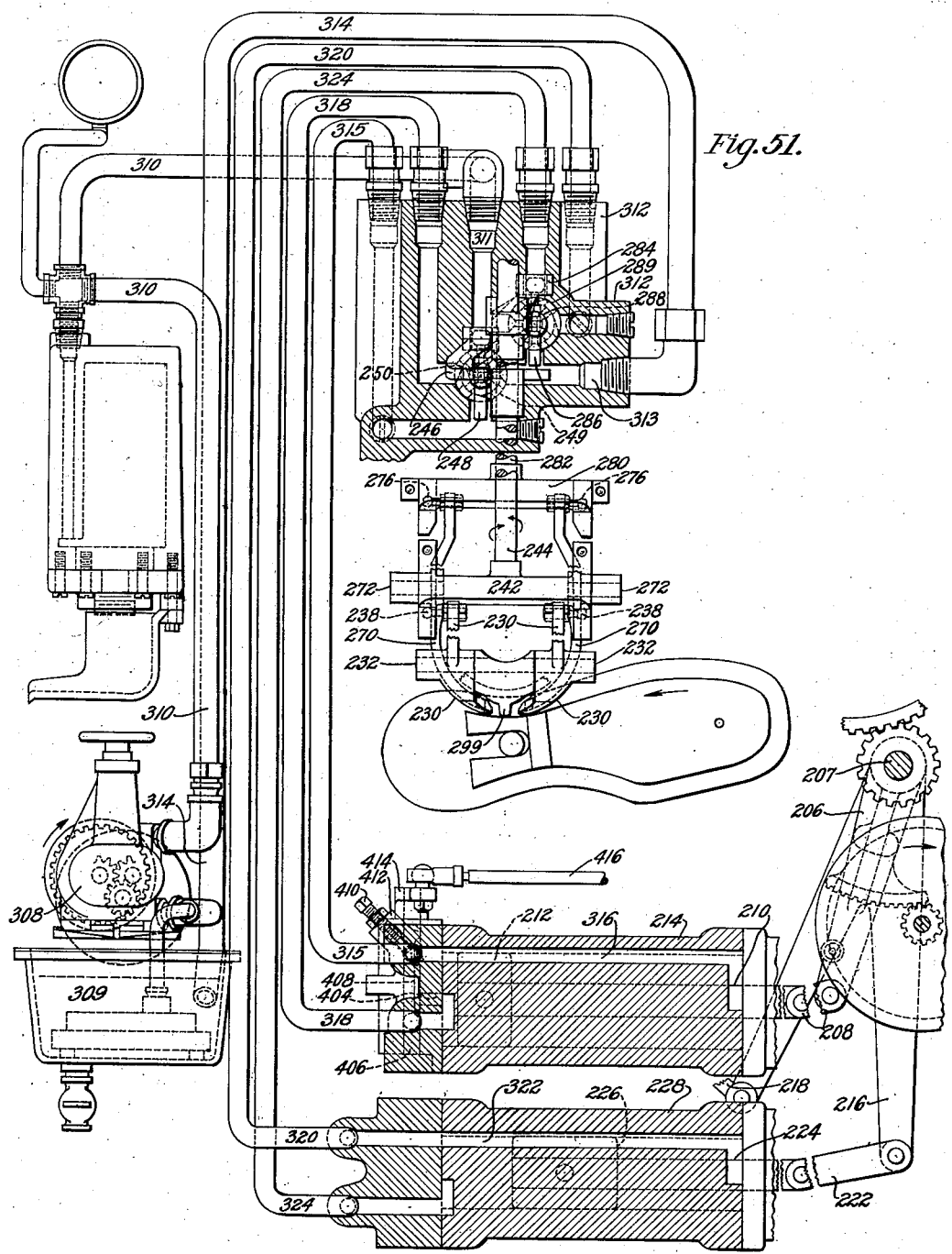

The several features of the invention consist also in the devices, combinations and arrangement of parts hereinafter described and claimed, which together with the advantages to be obtained thereby will be readily understood by one skilled in the art from the following description taken in connection with the accompanying drawings, in which Fig. 1 is a view in front elevation of an automatic edge trimming machine embodying the several features of the present invention, a portion of the base being broken away to show underlying parts; Fig. 2 is an enlarged view in right side elevation of the machine base with a portion of the shell broken away to show underlying parts; Fig. 3 is a plan view of the base taken on the section line 3—3 of Fig. 1; Fig. 4 is a plan view of the base with the cover broken away and with certain parts removed to illustrate particularly the connections for supporting and moving the jack including the feed arm and operating connections from the pattern cam shaft; Fig. 5 is an enlarged vertical sectional view illustrating in right side elevation of the edge trimmer and associated parts, including both sets of feelers, control valves, and the controlling connections from the trap door; Fig. 6 is a perspective view of the adjustable bracket or slide on which the templet gauge and feelers are supported; Fig. 7 is a sectional view in front elevation taken substantially on the line 7—7 of Fig. 5, illustrating particularly the mechanism controlled from the trap door for locking the jack turn and pitch control valves in neutral position, and a portion of the stop motion; Fig. 8 is a sectional plan view through the head of the machine taken substantially on the line 8—8 of Fig. 5, showing particularly the feelers and the valve control from the trap door; Fig. 9 is an enlarged detail plan view of certain of the connections from the pitch and turn cylinder pistons, together with the bypass valve control mechanism for the turn cylinder; Fig. 10 is a view of the by-pass valve control mechanism shown in Fig. 9 illustrating a different position of the parts; Fig. 11 is a sectional view taken on the line 11—11 of Fig. 9; Fig. 12 is an enlarged detail view in front elevation of the operating connections shown in Fig. 9 including the pattern cam lever post; Fig. 13 is an enlarged detail plan view of the pitch and turn cylinders and the oil pressure pump; Fig. 14 is a detail sectional view in front elevation taken on the line 14—14 of Fig. 13 to illustrate particularly the by-pass valve; Fig. 15 is an enlarged detail view in front elevation of the pitch and turn cylinders and oil pump illustrated in Fig. 13; Fig. 16 is a detail sectional view of the by-pass valve substantially similar to Fig. 14, but with the valve in a different position; Fig. 17 is a detail sectional view taken on the line 17—17 of Fig. 16; Fig. 18 is a sectional view in right side elevation taken substantially on the line 18—18 of Fig. 15, showing the turn and pitch cylinders and the oil pump; Fig. 19 is a detail sectional view taken on the line 19—19 of Fig. 13; Fig. 20 is a detail view in right side elevation of a portion of the mechanism for controlling the jack turn and pitch control valves from the trap door; Fig. 21 is a detail view in right side elevation illustrating particularly the pitch and turn cylinders and by-pass control mechanism; Fig. 22 is a view in front elevation of a portion of the work head showing particularly the feelers, templet gage, crease guide and cutter; Fig. 23 is an enlarged detail view in right side elevation of the front portion of the work head illustrating substantially the parts shown in Fig. 22; Fig. 24 is an enlarged detail view in right side elevation of the rear portion of the work head illustrating particularly the valve mechanism controlled from the feelers; Fig. 25 is an enlarged detail view of the valve stem utilized in each of the valve cylinders; Figs. 26 and 27 illustrate respectively the cylinders of the valves for controlling respectively the turning and longitudinal tipping movements of the jack; Fig. 28 is a detail sectional plan view taken on the line 28—28 of Fig. 24; Fig. 29 is a detail sectional plan view taken on the line 29—29 of Fig. 24; Fig. 30 is an enlarged plan view partly in section of the front portion of the work head, showing particularly the feeler mechanism; Fig. 31 is an enlarged plan view of the rear portion of the work head illustrating the valve control mechanism in locking position; Fig. 32 is a view similar to Fig. 31 with the valve mechanism unlocked; Fig. 33 is a rear elevation partly in section of a portion of the work head showing particularly the feeler valves and control mechanism therefor; Figs. 34 and 35 are developed views of the cylinders of the valve for controlling respectively the turning and longitudinal tipping movements of the jack; Fig. 36 is an enlarged detail view of one of the two identical valve stems journalled within and cooperating with the valve cylinders; Fig. 37 is a detail sectional plan view taken substantially on the line 37—37 of Fig. 36, illustrating particularly the valve for controlling the turning movements of the jack and the adjacent conduits; Fig. 38 is a detail sectional plan view similar to Fig. 37 showing the valve for imparting longitudinal turning movements to the jack together with the adjacent conduits; Fig. 39 is an enlarged view of the assembled valve and valve sleeve for controlling the longitudinal tipping movements of the jack; Fig. 40 is a plan view of the parts shown in Fig. 39; Figs. 41 to 44 inclusive are detail sectional views taken on the indicated section lines in Fig. 39; Fig. 45 is an enlarged detail view of the valve and valve sleeve for controlling the turning movements of the jack; Fig. 46 is a plan view of the parts shown in Fig. 45; Figs. 47 to 50 inclusive are detail sectional views taken on the indicated section lines in Fig. 45; and Fig. 51 is a somewhat diagrammatic view of the oil pressure connections controlled by the feeler mechanism for imparting turning and longitudinal tipping movements to the jack.

The automatic shoe machine illustrated in the drawings is an edge trimming machine of the general type disclosed in the patent to Morrill, No. 1,921,165, and as shown in Figs. 5, 22, 23 and 30 of the drawings, includes a rotary cutter 50 supported on a vertical spindle 52 in the machine head 54, and a crease guide 56 comprising a semi-circular plate which is arranged to engage with the crease of the shoe and is hollowed out to receive the bottom edge of the cutter 50. The crease guide 56 is formed on the forward end of a supporting arm 57 which is supported at its rear end for forward and rearward adjustment on a depending support 58 formed on the casing of the machine head by means of a clamping bolt 59 which extends through an elongated slot 60 in the arm 57 and is screw-threaded to the depending support 58. A large knurled head is formed on the end of the clamping bolt 59 for the convenience of the operator in making this adjustment. The supporting arm 57 for the crease guide 56 is supported intermediate its length by means of an adjusting pin 62 which has an eccentric portion 64 journalled in the arm 57, and is arranged at each end to engage in corresponding slots in two lugs 66 formed on the under side of a forwardly extending portion of the casing of the machine head. The pin 62 may be rotated to secure a vertical adjustment of the crease guide 56 and is held rigidly in position in the arm 57 by means of a set screw 68.

The machine head 54 is mounted on a base 78 which provides a support also for the stop motion of the machine generally indicated at 80 (Fig. 1), and for the shoe supporting jack together with supporting and actuating mechanisms hereinafter more fully to be described.

The stop motion of the present machine is of usual construction as exemplified, for instance, in the patent to Lawson, No. 1,706,619, and comprises briefly a constantly rotating vertical drive shaft 84 and a main driving clutch 85 which is connected through reduction gearing illustrated generally in Figs. 1 and 4 to drive the pattern cam shaft 86 which operates to control the movements of the jack as the operation progresses about the sole margin of the shoe. The stop motion as in the above-mentioned patent includes an eccentric 87 which is turned through one revolution at the end of the operation on the shoe and operates to disengage the jack and shoe mounted thereon from the shoe operating devices and to complete the rotation of the pattern cam shaft through a complete revolution, so that the several cooperating mechanisms are brought back to their original starting positions.

The shoe supporting jack of the present machine as illustrated in Figs. 1, 2, 3 and 4 of the drawings, is substantially that set forth in applicant's prior Patent No. 1,897,526, and briefly comprises a toe support 88 which is formed on the upper end of a vertical spindle 89 and a heel support 90 pivotally secured thereto. The spindle 89 is supported at its lower end on gimbal bearings on a wheel 92 which is rotatably mounted on a fixed stud at the forward end of a horizontal arm 94 to permit the jack to be turned and to be moved in any direction about its pivot. At its rear end the arm 94 is mounted for vertical swinging movements about a pivot 96 formed on a bracket 98 which is in turn mounted for lateral swinging movements on pivots 100 and 101 formed in the upper and lower ends of a bifurcated frame 102. The frame 102 is mounted at its lower end on stationary bearings 104 to swing forwardly and rearwardly of the machine. With this construction and arrangement of the supporting mechanism, it will readily be seen that the lower end of the jack spindle 89 may be moved freely in any direction to impart the required tipping movements to the jack as the point of operation is transferred about the shoe.

The jack is supported in an inoperative position when the machine is not in operation by means of a control arm 106 which is connected at its forward end by a gimbal bearing 107 to the jack supporting spindle 89, and at its rear end to a depending lever arm 108 which is pivotally secured at 109 to the base. The jack is moved away from the machine after the completion of an operation on a shoe by means of a frame or trap door 110 which is pivotally mounted on a bearing pin 111 and is arranged to swing downwardly and forwardly into engagement with a hook 112 formed on the control arm 106. The operation of the trap door is controlled from an eccentric strap 113 on the eccentric 87 of the stop motion above referred to, and is connected by means of a link 113 to an arm 115 formed on a vertical rock shaft 116. There is also mounted to turn with the rock shaft 116 a gear segment 117 which meshes with a corresponding gear segment 118 formed on an arm 119 secured to the pivot pin 111. A pin 120 is formed on the arm 119 to engage with the trap door 110, so that the operation of the eccentric in stopping the machine acting through the connections described, will cause the arm 119 to be swung downwardly to the left, as shown in Fig. 5, and cause the pin 120 to engage with and advance the trap door to move the jack to its inoperative position. The arm 119 and pin 120 are then returned to their original positions as the eccentric completes a full revolution to its starting position.

With the present embodiment of the invention, a templet 1060 is mounted in a predetermined position on the bottom of the shoe sole to provide an arbitrary marginal contour for controlling certain operations on the bottom margin of the shoe. This templet is located on the shoe sole and with relation to the supporting last by means of a pin on the last which extends upwardly through the shoe sole into engagement with the slotted rear end of the templet and a locating pin formed to engage with a corresponding indentation in the shoe sole, and is rigidly clamped in position by means of a clamping member 1080 supported on an arm 1100 pivoted at 1120 to the lower end of the toe portion 88. The operation of the clamping member 108 is controlled by means of a hand lever 114 pivoted on the arm 110 and provided with a cam slot 1160 engaging a pin 1180 on the sliding clamping member 108.

For a more complete description of the templet and the method of mounting the same, reference may be had to the inventor's prior Patent No. 1,897,527, dated February 14, 1933.

In the construction herein disclosed, the jack is controlled partly by means of a pattern cam mechanism which is substantially that disclosed in the applicant's prior patents above referred to, and partly by means of hydraulically operated pistons controlled by feelers which engage with the marginal and sole contours on the shoe.

The feeding movements are imparted to the jack through connections which are substantially those illustrated in the patent to Lawson above referred to, No. 1,706,619, and comprise a feed lever arm 124 pivoted at 126 to the base, and at its forward end connected through a link 128 with the toe portion of the jack. The feed lever 124 is connected through the links 130 and 132 to one arm of a cam feed lever 134 which is pivoted on a shaft 136 and has a second arm provided with a roll 138 arranged to engage with the usual feed cam 140. The path of the connection between the links 130 and 132 is controlled by an arm 142 pivoted at 144 on a lever 146 which is pivoted at 148 on the frame, and generally referred to as the fulcrum carrying lever. While a new shoe is being placed in the machine and positioned for the beginning of a new operation, the fulcrum lever 146 is unlocked and is free to be adjusted in accordance with the size of the shoe. As the new shoe is moved to operating position in the machine, the fulcrum carrying lever is permitted to position itself in accordance with the position assumed by the feed lever which is determined by the size of the shoe in the machine. As the starting foot treadle is now depressed to put the machine in operation, the fulcrum carrying lever 146 is locked in its adjusted position by means of mechanism which comprises briefly a rod 150 pivotally connected at one end to the fulcrum carrying lever 146, and a clamping device generally indicated at 152 for clamping the rod 150 and fulcrum carrying lever 146 rigidly in position.

The clamping device 152 is actuated to lock the fulcrum carrying lever 146 in its adjusted position through connections comprising a controller lever 154 which is mounted to turn on a stud 156 and is connected at its free end by means of a link 158 to the clamping device 152. The controller lever 154 is connected also by a link 160 to a lever 162 which is sleeved onto a stud 164 and carries a projecting arm 166 arranged to extend into the path of a pin 170 on a horizontally located longitudinally movable starting rod 168. Upon the depression of the foot treadle 172 of the machine, the consequent movement of the starting rod 168 to the right as viewed in Fig. 4, causes the pin 170 to engage with the projecting arm 166 to rotate the lever 162 and through the connections above described, to clamp the rod 150 and fulcrum carrying lever 146 in their adjusted position.

The frame 102 is moved forwardly and backwardly on the bearings 104 to impart the required lateral tipping movements to the jack in timed relation to the feeding movements of the jack by means of actuating connections comprising a cam lever 180 having one arm connected by means of a short link 182 to the frame 102, and the other arm provided with a cam roll 184 arranged to ride on a corresponding cam 186 on the pattern cam shaft 86.

With the present construction, the turning movements are imparted to the jack through hydraulically operated mechanism which is controlled as will be hereinafter more fully explained, by means of feelers engaging with an arbitrary marginal surface contour formed on the templet. The mechanism through which the turning movements are imparted to the jack (see Figs. 1 to 4, 9, 12, and 15) comprises a pulley 188 loosely mounted to turn on a pivot shaft 190 and having secured thereto one end of a cord 192 which passes around an idler pulley 194 on the jack supporting arm, around the wheel 92 on which the jack is supported, around an idler pulley 196 on the supporting arm 94, and over an idler pulley 198 to a counterbalancing weight 200. The pulley 188 is controlled through connections which comprise a pinion 202 formed on the hub of the pulley 188, and arranged to engage with a gear segment 204 formed on one arm of an actuating lever 206 which is loosely sleeved on the pivot shaft 207. Another arm of the lever 206 is connected through a link 208 and a pivot pin 209 to a plunger 210 which has supported thereon a piston 212 arranged to slide in an oil pressure cylinder 214 for controlling the turning movements of the jack. The plunger 210 is supported and guided adjacent its free end by means of two guide blocks 213 which are mounted respectively on each end of the pivot 209 and are arranged to ride in guideways formed in a supporting frame 215.

Longitudinal or pitch tipping movements are imparted to the jack through hydraulically operated mechanism which is controlled, as will hereinafter be more fully explained, by means of feelers engaging the bottom surface of the shoe sole. The mechanism through which the longitudinal tipping movements are imparted to the jack comprises an actuating lever 216 loosely sleeved on the pivot shaft 207. One arm of the lever 216 is connected by means of a link 218 to a lever arm 220 formed on the bracket 98 on which the supporting arm 94 of the jack is mounted for moving the jack support laterally of the machine. The other arm of the actuating lever 216 is connected by means of a link 222 and a pivot pin 223 to a plunger 224 which carries a piston 226 arranged to slide in an oil pressure cylinder 228 for controlling the longitudinal tipping movements of the jack. The plunger 224 is supported and guided adjacent its free end by means of two guide blocks 227 which are mounted respectively on each end of the pivot pin 223 and are arranged to ride in guideways formed in a supporting frame 229.

Oil under pressure is admitted to the control cylinders for imparting turning and longitudinal pitch tipping movements to the jack through connections including control valves which are operated by means of the feeler mechanisms above mentioned. The feeler mechanism for controlling the turning movements of the jack comprises two feelers 230 (see Figs. 5, 8, 22, 23 and 30) which are pivotally hung from a cross shaft 232 mounted on an adjustable bracket or slide 234 on the machine head, and are provided at their lower ends with forwardly extending nubs arranged to bear against the marginal contour surface above referred to, on the templet. The feeler members are provided each with a rearwardly extending arm which carries a bearing pin 238, which pins are arranged to engage underneath the corresponding surfaces 240 formed on opposite ends of a cross bar 242 which is rigidly secured to a rearwardly extending rock shaft 244. There is secured to the rear end of the rock shaft 244, as illustrated in Figs. 24 and 33, a downwardly extending arm 246 bifurcated at its lower end to engage with a control pin 248 projecting radially from the upper end of a valve stem 250 which forms part of a feeler control valve 249 for determining the turning movements of the jack. A balance is maintained between the two feelers and the frame of the machine by means of two vertical spring plungers 252 which are journalled in fixed brackets 254 and are provided at their lower ends with pointed tips to engage corresponding recesses in opposite ends of the cross bar 240. Each of the plungers 252 is pressed yieldingly downwardly by means of a compression spring 256 coiled about the plunger 252 and arranged to bear at its lower end against a collar 258 on the plunger, and at its upper end against an adjustable bushing 260 screw-threaded into the upper end of the bracket 254 and provided with a knurled head to permit a convenient adjustment of the pressure exerted by the spring 256. The movement of the feeler arms 230 and cross bar 240 in either direction from a control or neutral position, is limited by the engagement of one or the other of the feeler arms 230 with a corresponding adjustable stop screw 262 on the slide 234.

The feeler mechanism for controlling the longitudinal tipping or pitch movements of the jack comprises the two feeler arms 270 which are freely mounted to turn on a cross shaft 272 rigidly secured to the slide 234, and are provided at their forward ends with tips arranged to engage the bottom surface of the shoe sole adjacent to and one at each side of the point of operation upon the shoe. The feeler members 270 are each provided with a rearwardly extending arm which carries a roll 276 adapted to engage upon a bearing surface 278 on a cross bar 280 which is rigidly secured to a rearwardly extending rock shaft 282. A downwardly extending lever arm 284 is secured to the rear end of the rock shaft 282, and is bifurcated at its lower end to engage with a control pin 286 mounted on the upper end of a valve stem 288 which forms a part of a control valve 289 for controlling the pitch tipping movements of the jack. In order to balance and to damp the movement of the cross head 280, two spring-pressed plungers 290 are journalled within cylindrical brackets 292 on the machine frame, and are provided at their lower ends with offset portions terminating each in an upwardly extending point 293 arranged to engage with a corresponding recess formed in the cross head assembly 280. A compression spring coiled about each of the plunger shafts 290 between the bottom of the recess in the bracket 292 and a knurled nut 294 at the upper end of the plunger shaft, tends to raise the plungers and to maintain a substantially constant balance in the position of the feelers. The movement of the feelers 270 and cross head 280 in either direction from an intermediate or neutral position is limited by the engagement of one or the other of the feeler arms 270 with corresponding stop pins 295 screw-threaded for adjustment in lugs formed at each side of the slide 234.

The turning of the control valves 249 and 289 by their respective feeler mechanisms for controlling the turning and longitudinal or pitch tipping movements of the jack as above described, operates to control the supply of fluid pressure respectively to the jack turning control cylinder 214 and the pitch cylinder 228. A sensitive and accurate control of the turning movements of the jack by the feeler mechanism is thus made possible.

The bracket or slide 234 (see Figs. 5, 6, 8, 22, 23 and 30) on which the supporting cross shafts 232 and 272 for the feeler arms are mounted, comprises an oval-shaped frame which extends around the cutter spindle 52, and is formed on the forward end of a slide block 296 mounted in a guideway 297 on the machine casing. A depending arm 298 formed on the forward end of the bracket 234 carries at its lower end a templet gage in the form of a nub 299 which is arranged to engage with the marginal contour surface of the templet to determine the edge contour of the shoe sole. The bearing surfaces of the feelers 230 for controlling the turning movements of the jack, are located closely adjacent to the templet gage 299 on each side thereof, and as above described, operate to control the turning of the shoe, so that the portion of the sole edge being operated upon will be maintained at all times parallel to the line of feed. With this construction and arrangement of the parts, which insures that the cutter and edge gage will always be maintained in a line normal to the portion of the templet engaged by the gage, a uniform distance is maintained between the contour surface of the templet and the cutter to insure an exactly corresponding contour of the sole edge as the point of operation is transferred about the shoe.

For adjusting the position of the bracket 234 and of the edge gage 299 and feeler arms supported thereon to determine the width of the sole edge from the templet, a rack 300 is formed in the upper side of the slide block 296 and engages with a gear segment 301 on a short rock shaft or pin 302 which is journalled in a lug 303 on the casing, and is provided at its outer end with a knurled head 304 for the convenience of the operator in making the adjustment. A clamping nut 305 screw-threaded to the rock shaft 302 is arranged for clamping engagement with the lug 303 to lock the parts in their adjusted position. A scale designated at 306 on the guideway 297, and a pointer 307 secured to the slide block 296, serve to provide a direct reading of the adjustment of the edge gage and feelers to determine the width of the sole margin.

The fluid pressure system of the present machine (see Figs. 12 to 19 inclusive and 51) comprises an oil pressure pump 308 which pumps oil under pressure from a reservoir 309 through a pressure line 310 to an inlet port 311 which is formed in the valve casing 312 and serves as an inlet for both the turn and the pitch control valves. Oil pressure is exhausted from the two valves through an exhaust port 313 which is formed in the valve casing 312, and is connected through an exhaust line 314 to the reservoir or sump 309. Oil under pressure is transmitted to or exhausted from either end of the turn cylinder 214 through the turn control valve 250 by means of a pipe line 315 which is connected through a conduit 316 to the right hand end of the cylinder as illustrated in Fig. 51, and by means of a pipe line 318 which is connected to the left hand end of the cylinder. Oil pressure similarly is supplied to and exhausted from each end of the jack pitch cylinder through the pitch feeler control valve by means of a pipe line 320 and conduit 322 which connects with the right hand end of the cylinder, as illustrated in Fig. 51, and a pipe line 324 which connects with the left hand end of the pitch cylinder.

The construction and operation of the turn and pitch feeler control valves will be explained particularly in connection with Figs. 22, 26, 27 and 31 to 51 inclusive. The valves comprise respectively the valve stems 250 and 288 which are identical in construction, being each provided with two ports 326 and 328 set at right angles to each other and occupying respectively the upper and lower portions of the valve stem as shown in Figs. 25 and 36. The valve stem in each instance is mounted to turn freely within a valve sleeve which is in turn rigidly supported within the casing 312.

It will readily be seen from an inspection of Figs. 34 and 35 which are developed views respectively of the jack turn valve sleeve designated at 249 and the jack pitch valve sleeve designated at 289, that these sleeves are identical except that their positions are reversed. The operation of the turn valve may be best described in connection with Figs. 24 to 29 and 31 to 51 of the drawings. If it be assumed that the feelers for controlling the turning of the jack are occupying a neutral position, the rock shaft 244, lever arm 246 and control pin 248 will similarly occupy a neutral position with the valve stem 250 in substantially the position shown in Figs. 24, 28, 29, 31 to 33 inclusive, and 51. With this position of the parts it will be seen that all four of the conduits including the pressure and exhaust lines and the two lines 315 and 318 to opposite ends of the cylinder are closed. If it is now assumed that one of the feelers is advanced with relation to the other by the position of the contour surface on the templet, a corresponding turning movement of the valve stem 250 takes place to cause oil to be exhausted from one end and to be supplied under pressure to the other end of the jack turn cylinder 214 for rotating the jack in a direction to bring the feelers back to their normal position.

If it be assumed that the point of operation is approaching the toe of the shoe, and the contour surface of the templet in advance of the point of operation has begun to fall away so that it becomes necessary to turn the jack in a counter-clockwise direction, the relative movement of the feelers will cause the valve stem 250 to be turned in a counterclockwise direction as viewed in Figs. 32 and 46 to 50 inclusive. Under these conditions the exhaust line 314 will be connected through a port 327 in the sleeve 249, and conduit lines 328 in the lower portion of the valve stem 250 as illustrated in Figs. 28 and 37, to a port 330 in the sleeve 249 and the pipe line 315 to the right hand end of the jack turn cylinder 214. At the same time the pressure line 310 and pressure inlet port 311 will be connected as illustrated in Figs. 29 and 37 through the port 332 in the sleeve through the channels 326 in the upper portion of the valve stem 250 to a port 334 in the sleeve which is connected by means of a channel 336 and port 337 in the sleeve to the pipe line 318 which leads to the left hand end of the turn cylinder.

Similarly, a clockwise movement of the valve stem 250 under the influence of the feeler members 230 will operate to turn the jack in a clockwise direction as follows:—Assuming the valve stem 250 has been turned in a clockwise direction as shown in Figs. 45 to 50, it will readily be seen that the oil under pressure passes from the pressure line 310 and port 311 through the port 332 in the sleeve and the channels 326 in the valve stem to the port 330, and thence to the pipe line 315 leading to the right hand end of the jack turn cylinder 214. At the same time the exhaust line 314 and exhaust port 313 (see Fig. 28) are connected through the port 327 in the sleeve through conduit channels 328 in the lower portion of the valve stem, and port 337 in the sleeve to the pipe line 318.

The construction and mode of operation of the feeler control valve for determining the pitch or longitudinal tipping movements of the jack, will be best understood in connection with Figs. 24, 28, 29, 35, 36, 38 and 39 to 44 inclusive of the drawings. As previously pointed out, the pitch valve sleeve is identical with the turn valve sleeve except that it is reversed end for end, and rotated 90° in the valve block 312. The valve stem 288 is identical in all respects with that illustrated in connection with the turn valve, and occupies the same angular position in the machine. As illustrated in Figs. 28 and 29, the valve stem 288 is in neutral position corresponding to the neutral position of the feelers 270 when the shoe is in the correct operating position. As the point of operation progresses along the shoe, if it be assumed that the sole slants upwardly, a corresponding variation in the position of the feelers causes the valve stem 288 through the connections above described, to be rotated in a counterclockwise direction, so that oil under pressure is permitted to pass from the pressure line 310 and port 311 through the ports 350 in the sleeve and 328 in the valve stem to the port 352 in the sleeve connecting with the pipe line 320 to the right hand end of the pitch cylinder 228. At the same time oil pressure is exhausted from the left hand end of the jack pitch cylinder through the pipe line 324 through ports 354 in the valve sleeve, port 326 in the valve stem 288 to a port 356 in the valve sleeve connecting with the exhaust port 313 and line 314, thus causing the portion of the shoe sole being operated upon to be brought back to a level position, when the valve will again be brought back to neutral position by the operation of the feelers to check further longitudinal tipping movements of the jack. If the bottom surface of the shoe sole now begins to slope downwardly in the direction of feed, the corresponding movement of the feelers will cause the pitch valve stem to be rotated in a clockwise direction from neutral position, so that fluid under pressure will be permitted to pass from the pressure line 310 and port 311 through the port 350 in the valve sleeve and the port 328 in the valve stem 288 to a port 358 in the valve sleeve, which connects through a channel 359 with the port 354 and pipe line 324 to introduce fluid under pressure to the left hand end of the pitch cylinder. Simultaneously, fluid is exhausted from the right hand end of the pitch cylinder through the conduit 322, pipe line 320 and port 352 in the cylinder through the port 326 in the valve stem 288 to the port 356 connecting with the exhaust port 313 and line 314.

It has been found desirable when the shoe is moved out of operating position with relation to the operating devices at the end of an operation upon a shoe, to position and lock the feelers and control valves for imparting pitch and turning movements to the jack in neutral position. To this end a locking mechanism has been provided which is rendered operative as the shoe is moved away from the work, to engage with and center the valve control pins 248 and 286 in their neutral position. This mechanism, as best shown in Figs. 5, 7, 8, 20, 24, 31, 32 and 33, comprises two horizontally located plungers 371 and 372 which are mounted in parallel relationship in a bracket 374, and are provided at their forward ends with V-shaped notches to engage respectively with the free ends of the control pins 248 and 286 on the turn and pitch control valves. The position of the plungers is controlled by means of a locking lever 376 which is mounted on a pivot 378 on the bracket 374, and is provided with two downwardly extending actuating arms 380 for controlling simultaneously the movements of the two plungers. Each plunger is bored to receive a sliding block 382 which is yieldingly forced against the lower end of the corresponding actuating arm 380 by means of a compression spring 384 seated in the forward end of the bore. There is also mounted in the rear end of each bore, a screw-threaded plug 386 which is adjustably secured in position by a locking nut 388, and is provided at its forward end with a bearing surface to engage the opposite side of the corresponding actuating arm 380. The locking lever 376 is connected by means of a link 390 to a projecting arm 392 formed on the hub of the trap door 110. With this construction and arrangement of the parts, it will readily be seen that as the trap door is swung downwardly at the end of the operation upon the shoe to move the jack away from the machine, the upper portion of the locking lever 376 is correspondingly depressed to advance the actuating arms 380 and plugs 382, which in turn act through the compression springs 384 to advance the locking plungers 371 and 372 into locking engagement with the valve control pins 248 and 286. The engagement of the V-shaped slots of the locking plungers with the pins, tends to center and lock the control pins and valves in neutral position. As the trap door is again released and permitted to move upwardly in starting the machine, the corresponding upward movement of the locking lever 376 will cause the actuating arms 380 to engage with the bearing surfaces on the plugs 386 to positively withdraw the locking plungers 371 and 372 to an inoperative position, thus releasing the feelers and turn and pitch control valves.

In carrying out certain features of the present invention, a novel and improved mechanism has been provided which is arranged as the trap door 110 swings downwardly and forwardly in stopping the machine for moving the jack and shoe supported thereon out of engagement with the operating devices, to rotate the jack in a clockwise direction as viewed from above to its starting position preparatory to placing a new shoe in the machine. This mechanism comprises a by-pass mechanism which is arranged when rendered operative to permit oil to flow freely from one end to the other of the turn cylinder 214, thus disconnecting the piston 212 for controlling the turning movements of the jack from the turn control valve 250 and the feelers 230, so that the jack is permitted to turn freely in a clockwise direction under the influence of the counterbalancing weight 200 and cord 192 passing around the wheel 92 for controlling the turning movements of the jack. As best shown in Figs. 13 to 19 inclusive, and 51, a by-pass conduit 400 is provided between the channel 316 and the left hand end of the turn cylinder 214 comprising a vertical channel 400 connected at its upper end to the channel 316 and pipe line 315, and at its lower end to a cross bore 402 which is connected through a port 404 to the turn cylinder 214, and has fitted therein a cylinder by-pass valve stem 406. One side of the valve stem 406 is cut away to provide a port 408 through which oil is by-passed from the conduit 316 and channel 400 to the left hand end of the cylinder for the open position of the valve illustrated in Fig. 16. During the normal operation of the machine the valve stem is turned to the angular position illustrated in Fig. 14, to cut off the by-pass. In order to control the rate at which oil may be transferred from one end of the cylinder to the other, and thus to regulate the rate of return of the jack to starting position, a check valve is provided in the by-pass channel 400 comprising a valve stem 410 which is arranged to extend across the channel 400 and is screw-threaded for adjustment in a cylindrical block 412 forming an integral part of the cylinder casing.

The by-pass valve stem 406 is rocked, in stopping the machine, to the open position illustrated in Fig. 16 to permit the jack to be rotated to its starting position, and is then closed to arrest the further movement of the piston 212 when the jack reaches the desired stop position through mechanism which comprises an upwardly extending arm 414 secured to the valve stem 406 and connected by a link 416 to one arm of a lever 418. The lever 418 is mounted to turn on a stud 420, and is limited in its movement in either direction by means of a stationary pin 422 which is positioned between two projecting arms 424 formed on an extension of the lever 418. The actuating lever 418 is moved in a counterclockwise direction as illustrated in Fig. 10 on its stud 420 to open the by-pass valve in stopping the machine by means of a by-pass cam lever 426 which is mounted to turn on the cam lever pivot shaft 207 and carries on one arm a cam roll 428 adapted to engage with a V-shaped cam 430 on the pattern cam shaft 86. The other arm of the lever is provided with a roll 432 which is arranged, when rendered operative by the engagement of the roll 428 with the cam 430, to engage with a depending arm 434 of the actuating lever 418 to open the by-pass valve. A spring 436 connected at one end to the cam lever 426, and at its other end to a stop pin 438 tends normally to maintain the cam lever 426 in a retracted position against the pin 438.

The by-pass valve is closed at a predetermined point in the return movement of the piston 212 and plunger 210 through connections which comprise a roll 440 mounted on the turn lever 206 which is arranged during the return movement of the lever 206 to engage with a tail 442 formed on a lever arm 444 pivoted on a stud 446 on the lever 418, and normally held in fixed relationship to the lever 418, so that the continued return movement of the turn lever 206 will cause the actuating lever 418 to be rotated in a clockwise direction to move the link 416 to the right and close the by-pass valve. The lever arm 444 is mounted on the rear side of the actuating lever 418 as illustrated, for instance, in Fig. 10, and is provided with a tongue 448 which is arranged to extend across the front face of the lever 418 to prevent lateral movement of the lever arm 444 with relation to the actuating lever lever 418. A compression spring 452 supported in a recess in the lever 418 is arranged to engage with the under side of the lever 444, and acts to maintain the lever in engagement with an abutment 450 formed on the rear side of the actuating lever 418. With this arrangement of the parts, it will be seen that a yielding connection is provided between the lever arm 444 and actuating lever 418, so that the continued movement of the turn lever 206 and roll 440 riding on the tail 442, can act to further depress the lever arm 444 after the actuating lever 418 has reached the end of its clockwise movement upon the engagement of the stationary pin 422 with the upper of the two projecting arms 424 on the lever 418. In order to provide for an adjustment in the timing of the mechanism for shutting off the by-pass valve to determine the angular position of the jack when at rest, the pivot stud 446 for the lever arm 444 is mounted for adjustment in a slot 456 in a lateral extension of the lever 418, so that the lever arm 444 and tail 442 may be adjustably positioned to engage with the roll 440 at the desired point in the return movement of the turn lever 206.

A preferred embodiment of the invention having been described, and the nature and scope of the invention having been indicated, what is claimed is:

1. A machine for operating upon shoes having, in combination, means for operating upon the bottom margin of a shoe, a shoe supporting jack, means for feeding the jack to transfer the point of operation about the shoe, a feeler mechanism arranged to engage a marginal contour surface fixed with relation to the shoe, devices controlled by said feeler mechanism for imparting rotating movements to the jack to maintain the shoe margin substantially normal to said operating means at the point of contact, a feeler mechanism engaging the surface of the shoe sole, and devices controlled by said latter feeler mechanism for imparting longitudinal tipping movements to the jack to maintain the surface of the shoe sole at the point of contact with said operating means substantially normal to said operating means in the direction of feed.

2. A machine for operating upon shoes having, in combination, means for operating upon the bottom margin of a shoe, a shoe supporting jack, means for feeding the jack to transfer the point of operation about the shoe, means for imparting rotational movements to the jack, a feeler mechanism arranged to engage a marginal contour surface fixed with relation to the shoe to control the rotational movements of the jack to maintain substantially a predetermined angular relationship of the shoe margin to said operating means at the point of contact, a feeler mechanism engaging the surface of the shoe sole, and devices controlled by said latter feeler mechanism for imparting longitudinal tipping movements to the jack to maintain substantially a predetermined angular relationship of the surface of the shoe sole in the line of feed to said operating means at the point of contact therewith.

3. A machine for operating upon shoes having, in combination, means for operating upon the bottom margin of a shoe, a shoe supporting jack, connections including a pattern cam for feeding the jack to transfer the point of operation about the shoe, connections including a pattern cam for imparting lateral tipping movements to the jack to maintain a predetermined angular relationship of the shoe sole to said operating means laterally of the direction of feed, a feeler mechanism arranged to engage a marginal contour surface fixed with relation to the shoe, devices controlled by said feeler mechanism for imparting rotating movements to the jack to maintain the shoe margin substantially normal to said operating means at the point of contact, a feeler mechanism engaging the surface of the shoe sole, and devices controlled by said latter feeler mechanism for imparting longitudinal tipping movements to the jack to maintain the surface of the shoe sole at the point of contact with said operating means substantially normal to said operating means in the direction of the line of feed.

4. A machine for operating upon shoes having, in combination, means for operating upon the bottom margin of a shoe, a shoe supporting jack, a pattern feed cam, and connections for feeding the jack to transfer the point of operation about the shoe, connections including a pattern cam for imparting lateral tipping movements to the jack to maintain a predetermined angular relationship of the shoe sole to the operating means laterally of the line of feed at the point of contact, a feeler mechanism engaging a marginal contour surface fixed with relation to the shoe, devices controlled by said feeler mechanism for imparting rotational movements to the jack to maintain a substantially predetermined angular relationship of the shoe margin to said operating means to position said shoe margin in the line of feed at the point of contact, a feeler mechanism engaging the surface of the shoe sole, and devices controlled by said latter feeler mechanism for imparting longitudinal tipping movements to the jack to maintain substantially a predetermined angular relation of the surface of the shoe sole in the direction of the line of feed to said operating means at the point of contact therewith.

5. A machine for operating upon shoes having, in combination, means for operating upon the bottom margin of a shoe, a shoe supporting jack, a templet rigidly supported with relation to the shoe on the jack and having a marginal contour adjacent the sole edge, devices including a pattern feed cam for feeding the jack to transfer the point of operation about the shoe, devices including a pattern tip cam for imparting tipping movements to the jack laterally of the line of feed to determine the angular relationship of the shoe sole laterally of the line of feed to said operating means at the point of contact, a feeler mechanism engaging said marginal contour, devices controlled by said feeler mechanism for imparting rotational movements to the jack to position the shoe margin substantially in the line of feed at the point of contact with said operating means, a feeler mechanism engaging the surface of the shoe sole, and devices controlled by said latter feeler mechanism for imparting tipping movements to the jack longitudinally of the line of feed to maintain substantially a predetermined angular relationship of the surface of the shoe sole in the line of feed to said operating means at the point of contact therewith.

6. A machine for operating upon shoes having, in combination, means for operating upon the bottom margin of a shoe, a shoe supporting jack, a templet rigidly supported with relation to the shoe on the jack and having a marginal contour adjacent the sole edge, means for feeding the jack to transfer the point of operation about the shoe, a feeler mechanism engaging said contour surface of the templet, and devices controlled by said feeler mechanism for imparting rotating movements to the jack to maintain the shoe margin substantially normal to said operating means at the point of contact.

7. A machine for operating upon shoes having, in combination, means for operating upon the bottom margin of a shoe, a shoe supporting jack, a templet supported on the shoe sole in fixed relationship to the jack and shoe mounted thereon and having a marginal contour adjacent the sole edge, means for feeding the jack to transfer the point of operation about the shoe, a feeler mechanism engaging said contour surface of the templet, and devices controlled by said feeler mechanism for imparting rotating movements to the jack to maintain the shoe margin substantially normal to said operating means at the point of contact.

8. A machine for operating upon shoes having, in combination, means for operating upon the bottom margin of a shoe, a shoe supporting jack, a supporting pivot for said jack movable universally to impart tipping movements to the jack about the point of operation on the shoe, means for feeding the jack to transfer the point of operation about the shoe, a feeler mechanism arranged to engage a marginal contour surface fixed with relation to the shoe, and devices controlled by said feeler mechanism for imparting rotating movements to the jack to position the shoe margin substantially in the line of feed at the point of contact with said operating means.

9. A machine for operating upon shoes having, in combination, means for operating upon the bottom margin of a shoe, a shoe supporting jack, a supporting pivot for said jack movable universally to impart tipping movements to the jack about the point of operation on the shoe, means for feeding the jack to transfer the point of operation about the shoe, a feeler mechanism arranged to engage a marginal contour surface fixed with relation to the shoe, devices controlled by said feeler mechanism for imparting rotating movements to the jack to position the shoe margin substantially in the line of feed at the point of contact with said operating means, and means rendered operative upon the completion of an operation on the shoe for rotating the jack to starting position.

10. A machine for operating upon shoes having, in combination, means for operating upon the bottom margin of a shoe, a shoe supporting jack, a supporting pivot for said jack movable universally to impart tipping movements to the jack longitudinally and laterally of the line of feed about the point of operation on the shoe, a pattern cam shaft, a pattern feed cam on said shaft, connections controlled by said pattern feed cam for feeding the jack to transfer the point of operation about the shoe, a pattern tip cam on said cam shaft, connections controlled by said pattern tip cam for moving said pivot to impart lateral tipping movements to the jack, a feeler mechanism arranged to engage a marginal contour surface fixed with relation to the shoe, devices controlled by said feeler mechanism for imparting rotational movements to the jack to position the shoe margin substantially in the line of feed at the point of contact with said operating means, a feeler mechanism engaging the surface of the shoe sole, and devices controlled by said latter feeler mechanism for moving said pivot to impart longitudinal tipping movements to the jack to maintain substantially a predetermined angular relation of the surface of the shoe sole in the direction of feed to said operating means at the point of contact therewith.

11. A machine for operating upon shoes having, in combination, means for operating upon the bottom margin of a shoe, a shoe supporting jack, a pivot for the jack, supporting mechanism for moving said pivot universally about the point of operation on the shoe comprising a roll tip lever for moving said pivot laterally of the line of feed, and a pitch tip lever for moving said pivot longitudinally of the line of feed, connections including a pattern cam for feeding the jack to transfer the point of operation about the shoe, connections including a pattern cam for actuating said roll tip lever to impart lateral tipping movements to the jack at the point of operation on the shoe, a feeler mechanism arranged to engage a marginal contour surface fixed with relation to the shoe, devices controlled by said feeler mechanism for imparting rotational movements to the jack to position the shoe margin substantially in the line of feed at the point of contact with said operating means, a feeler mechanism engaging the surface of the shoe sole, and devices controlled by said latter feeler mechanism for actuating said pitch tip lever for imparting longitudinal tipping movements to the jack to maintain substantially a predetermined angular relation of the surface of the shoe sole in the direction of feed to said operating means at the point of contact therewith.

12. A machine for operating upon shoes having, in combination, means for operating upon the bottom margin of a shoe, a shoe supporting jack, means for feeding the jack to transfer the point of operation about the shoe, means for imparting tipping movements to the jack laterally of the line of feed to maintain a predetermined angular relationship of the shoe sole to the operating means laterally of the line of feed as the point of operation is transferred about the shoe, a feeler mechanism arranged to engage a marginal contour surface fixed with relation to the shoe, mechanism including a fluid pressure control piston for imparting rotational movements to the jack, a control valve operated by said feeler mechanism for controlling the application of pressure to said piston to maintain the shoe margin substantially in the line of feed at the point of contact with said operating means, a feeler mechanism engaging the surface of the shoe sole, mechanism including a fluid pressure operated piston for imparting tipping movements to the jack longitudinally of the line of feed, and a control valve operated by said latter feeler mechanism for controlling the application of fluid pressure to said latter piston to determine the angular relationship of the surface of the shoe sole in the line of feed to said operating means at the point of contact therewith.

13. A machine for operating upon shoes having, in combination, means for operating upon the bottom margin of a shoe, a shoe supporting jack, a pattern feed cam, connections controlled by said feed cam to transfer the point of operation about the shoe, a pattern tip cam, connections controlled by said pattern tip cam for imparting tipping movements to said jack laterally of the line of feed to determine the angular relationship of the shoe sole laterally of the line of feed to said operating means at the point of contact, a feeler mechanism arranged to engage a marginal contour surface fixed with relation to the shoe, connections including a fluid pressure controlled piston for imparting rotational movements to the jack, a control valve operated by said feeler mechanism for controlling the supply of fluid pressure to said piston to maintain the shoe margin substantially in the line of feed at the point of contact with said operating means, a feeler mechanism engaging the surface of the shoe sole, connections including a fluid pressure controlled piston for imparting tipping movements to the jack longitudinally of the line of feed, and a valve operated by said latter feeler mechanism for controlling the application of fluid pressure to said latter piston to maintain a substantially predetermined angular relationship of the surface of the shoe sole in the line of feed to said operating means at the point of contact therewith.

14. A machine for operating upon shoes having, in combination, means for operating upon the bottom margin of a shoe, a shoe supporting jack, means for feeding the jack to transfer the point of operation about the shoe, a feeler mechanism arranged to engage a contour surface fixed with relation to the shoe, devices controlled by said feeler mechanism for imparting rotating movements to the jack to maintain the shoe margin substantially normal to said operating means at the point of contact, and means in addition to the jack feeding means rendered operative upon the completion of an operation on the shoe for rotating said jack to starting position.

15. A machine for operating upon shoes having, in combination, means for operating upon the bottom margin of a shoe, a shoe supporting jack, means for feeding the jack to transfer the point of operation about the shoe, a feeler mechanism arranged to engage a contour surface fixed with relation to the shoe, devices controlled by said feeler mechanism for imparting rotating movements to the jack to maintain the shoe margin substantially normal to said operating means at the point of contact, and control mechanism rendered operative upon the completion of said operation about the shoe to move the jack and shoe supported thereon out of engagement with said operating means, and thereafter to cause said devices to rotate the jack in a reverse direction to starting position.

16. A machine for operating upon shoes having, in combination, means for operating upon the bottom margin of a shoe, a shoe supporting jack, a pattern cam shaft, connections including a pattern cam for feeding the jack to transfer the point of operation about the shoe, a feeler mechanism arranged to engage a marginal contour fixed with relation to the shoe, devices controlled by said feeler mechanism for imparting rotating movements to the jack to maintain the shoe margin substantially normal to said operating means at the point of contact, and a stop motion rendered operative at the end of the operation on the shoe to move the jack and shoe supported thereon away from said operating means and for rotating the jack in a reverse direction to starting position.

17. A machine for operating upon shoes having, in combination, means for operating upon the bottom margin of a shoe, a shoe supporting jack, a pattern cam shaft, connections including a pattern cam on said shaft for feeding the jack to transfer the point of operation about the shoe, connections including a pattern cam on said shaft for imparting lateral tipping movements to the jack to maintain a predetermined angular relationship of the shoe sole to said operating means laterally of the direction of feed, a feeler mechanism arranged to engage a marginal contour surface fixed with relation to the shoe, devices controlled by said feeler mechanism for imparting rotational movements to the jack to maintain the shoe margin substantially normal to said operating means at the point of contact, a feeler mechanism engaging the surface of the shoe sole, devices controlled by said latter feeler mechanism for imparting longitudinal tipping movements to the jack to maintain the surface of the shoe sole at the point of contact with said operating means substantially normal to said operating means in the direction of the line of feed, and means controlled from said pattern cam shaft at the end of the operation on the shoe for operating said jack rotating devices to return the jack to starting position.

18. A machine for operating upon shoes having, in combination, means for operating upon the bottom margin of the shoe, a shoe supporting jack, means for feeding the jack to transfer the point of operation about the shoe, a feeler mechanism arranged to engage a marginal contour surface fixed with relation to the shoe, mechanism including a fluid pressure control piston for imparting rotational movements to the jack, a control valve operated by said feeler mechanism for controlling the application of pressure to said piston to maintain the shoe margin substantially in the line of feed at the point of contact with said operating means, by-pass connections acting when rendered operative to permit a movement of the piston upon a rotation of the jack in a reverse direction to starting position, and means rendered operative at the end of the operation on a shoe for actuating said by-pass connections and for reversely rotating the jack to starting position.

19. A machine for operating upon shoes having, in combination, means for operating upon the bottom margin of a shoe, a shoe supporting jack, means for feeding the jack to transfer the point of operation about the shoe, a feeler mechanism arranged to engage a marginal contour surface fixed with relation to the shoe, mechanism including a fluid pressure control piston for imparting rotational movements to the jack, a control valve operated by said feeler mechanism for controlling the application of pressure to said piston to maintain the shoe margin substantially in the line of feed at the point of contact with said operating means, means acting when rendered operative to move the jack and shoe supported thereon out of engagement with said operating means, by-pass connections acting when rendered operative to permit a movement of said piston upon the rotation of the jack in a reverse direction to starting position, and means rendered operative at the end of the operation on a shoe for moving the jack and shoe supported thereon away from the operating devices for actuating said by-pass connections and for rotating the jack to starting position.

20. A machine for operating upon shoes having, in combination, means for operating upon the bottom margin of a shoe, a shoe supporting jack, a pattern mechanism, connections controlled by said pattern mechanism for imparting feeding movements to the jack, a feeler mechanism arranged to engage a marginal contour surface fixed with relation to the shoe, mechanism including a fluid pressure control piston for imparting rotational movements to the jack, a control valve operated by said feeler mechanism for controlling the application of pressure to said piston to maintain the shoe margin substantially in the line of feed at the point of contact with said operating means, means rendered operative at the end of an operation on a shoe to move the jack and shoe supported thereon away from the work operating devices, and a locking device controlled by said means for locking the control valve in neutral position.

21. A machine for operating upon shoes having, in combination, means for operating upon the bottom margin of the shoe, a shoe supporting jack, a pattern mechanism, connections controlled by said pattern mechanism for imparting feeding movements to the jack, a feeler mechanism arranged to engage a marginal contour surface fixed with relation to the shoe, mechanism including a fluid pressure control piston for imparting rotational movements to the jack, a control valve operated by said feeler mechanism for controlling the application of pressure to said piston to maintain the shoe margin substantially in the line of feed at the point of contact with said operating means, a feeler mechanism engaging the surface of the shoe sole, mechanism including a fluid pressure operated piston for imparting tipping movements to the jack, a control valve operated by said latter feeler mechanism for controlling the application of fluid pressure to said latter piston to determine the angular relationship of the surface of the shoe sole to said operating means at the point of contact therewith, means rendered operative at the end of an operation on the shoe to move the jack and shoe supported thereon away from the work operating devices, and a locking mechanism controlled by said means for locking said control valves in neutral position.

22. A machine for operating upon shoes having, in combination, means for operating upon the bottom margin of a shoe, a shoe supporting jack, a pattern mechanism, connections controlled by said pattern mechanism for imparting feeding movements to the jack, a feeler mechanism arranged to engage a contour surface fixed with relation to the shoe, mechanism including a fluid pressure control piston for imparting rotational movements to the jack, a control valve operated by said feeler mechanism for controlling the application of pressure to said piston to maintain said contour surface and adjacent portion of the shoe margin in a predetermined angular position at the point of operation on the shoe, by-pass connections acting when rendered operative to permit movement of said piston upon a rotation of the jack in a reverse direction to starting position, a locking mechanism acting when rendered operative to lock the control valve in neutral position, and means rendered operative at the end of an operation on a shoe for moving the jack and shoe supported thereon away from the operating devices, for actuating said locking mechanism to lock the control valve in neutral position, for rendering said by-pass connections operative to permit a return of the jack to starting position, and for rotating the jack in a reverse direction to starting position.

ALFRED R. MORRILL.